US011048323B2

(12) United States Patent
Ho et al.

(10) Patent No.: US 11,048,323 B2
(45) Date of Patent: Jun. 29, 2021

(54) POWER THROTTLING IN A MULTICORE SYSTEM

(71) Applicant: Apple Inc., Cupertino, CA (US)

(72) Inventors: Ching Elizabeth Ho, Santa Clara, CA (US); Hao Chen, San Ramon, CA (US); Nitin Bhargava, Santa Clara, CA (US); Syed F. Ali, Irvine, CA (US)

(73) Assignee: Apple Inc., Cupertino, CA (US)

( * ) Notice: Subject to any disclaimer, the term of this patent is extended or adjusted under 35 U.S.C. 154(b) by 147 days.

(21) Appl. No.: 16/397,888

(22) Filed: Apr. 29, 2019

(65) Prior Publication Data

US 2020/0341533 A1    Oct. 29, 2020

(51) Int. Cl.
*G06F 1/329* (2019.01)
*G06F 1/3228* (2019.01)

(52) U.S. Cl.
CPC ............ *G06F 1/329* (2013.01); *G06F 1/3228* (2013.01)

(58) Field of Classification Search
CPC .... G06F 1/3228; G06F 18/329; G06F 1/3243; G06F 1/3275
USPC .................................................. 713/300, 320
See application file for complete search history.

(56) References Cited

U.S. PATENT DOCUMENTS

| | | | | |
|---|---|---|---|---|
| 7,596,707 B1* | 9/2009 | Vemula | ................. | G06F 1/3275 713/320 |
| 8,327,168 B2* | 12/2012 | Winick | ............... | G06F 12/0223 713/320 |
| 8,914,661 B2 | 12/2014 | Henry et al. | | |
| 9,383,806 B2 | 7/2016 | Lien et al. | | |
| 9,798,375 B1 | 10/2017 | Becker | | |
| 10,073,659 B2 | 9/2018 | Alexander et al. | | |
| 2010/0229012 A1* | 9/2010 | Gaskins | ................. | G06F 1/324 713/322 |
| 2012/0047385 A1* | 2/2012 | Henry | ................. | G06F 1/3203 713/340 |
| 2012/0185706 A1* | 7/2012 | Sistla | ................. | G06F 1/3203 713/300 |
| 2015/0370303 A1* | 12/2015 | Krishnaswamy | ....... | G06F 1/324 713/322 |

\* cited by examiner

*Primary Examiner* — Chun Cao
(74) *Attorney, Agent, or Firm* — Kowert, Hood, Munyon, Rankin & Goetzel, P.C.

(57) ABSTRACT

An apparatus includes a plurality of processor cores, a cache memory that includes a plurality of banks, and a power management circuit. The power management circuit is configured to maintain a power credit approach for the apparatus that includes tracking a total number of currently available power credits, and to store a plurality of threshold values. Each threshold value is associated with one or more of a plurality of throttling actions. In response to the total number of currently available power credits reaching a particular threshold value of the plurality of threshold values, the power management circuit performs the one or more throttling actions associated with the particular threshold value. The plurality of throttling actions includes selectively throttling one or more of the plurality of processor cores, and selectively throttling one or more of the plurality of banks in the cache memory.

24 Claims, 17 Drawing Sheets

POWER THROTTLING IN A MULTICORE SYSTEM

BACKGROUND

Technical Field

Embodiments described herein are related to the field of processing circuits, and more particularly to power management of a multicore processor.

Description of the Related Art

During operation, computing systems, including systems-on-a-chip (SoCs), may consume various amounts of power depending on a current workload. A power budget may be incorporated for a computer system for a variety of reasons, such as a limited power supply (e.g., a battery), a peak-power limit for a power supply, thermal limitations for the computer system (e.g., limited cooling ability), and the like. A multi-core computing system may be capable of exceeding the power budget when the workload is high and the computing system is operating in a high-performance mode to complete tasks associated with the workload.

A power management circuit may be used to provide power to the computing system and maintain operation of the computing system within the power budget. To operate within the power budget, the power management circuit may adjust one or more operating parameters of circuits within the computing system, such as adjusting a voltage level for a power signal in the computing system, or adjusting a frequency for a clock signal.

SUMMARY OF THE EMBODIMENTS

Broadly speaking an apparatus and a method are contemplated in which the apparatus includes a plurality of processor cores, a cache memory that includes a plurality of banks, and a power management circuit. The power management circuit may maintain a power credit approach for the apparatus that includes tracking a current number of available power credits, and to store a plurality of threshold values. Each threshold value may be associated with one or more of a plurality of throttling actions. In response to the current number of available power credits reaching a particular threshold value of the plurality of threshold values, the power management circuit may perform the one or more throttling actions associated with the particular threshold value. The plurality of throttling actions includes selectively throttling one or more of the plurality of processor cores, and selectively throttling one or more of the plurality of banks in the cache memory.

In one example of the apparatus, to selectively throttle one or more of the plurality of processor cores, the power management circuit may, in response to reaching the particular threshold value, determine a particular order for stalling the plurality of processor cores. The power management circuit may then select, according to the particular order, a particular processor core to stall for a next clock cycle, and select, according to the particular order, a next processor core to stall for a subsequent clock cycle.

In another example of the apparatus, to selectively throttle one or more of the plurality of processor cores, the power management circuit may, in response to reaching a different threshold value, determine a different order for stalling the plurality of processor cores. Based on the different order, the power management circuit may select two or more processor cores to stall for a next clock cycle.

In one example of the apparatus, to selectively throttle one or more of the plurality of banks in the cache memory, the power management circuit may, in response to reaching the particular threshold value, determine a particular pattern for inserting idle cycles for the cache memory. Based on the particular pattern, the power management circuit may assert an indication for an idle cycle. The cache memory may, in response to detecting the indication for an idle cycle, stall an assignment of a memory request to a corresponding memory bank.

In an example of the apparatus, to selectively throttle one or more of the plurality of banks in the cache memory, the power management circuit may, in response to reaching a different threshold value, determine a different pattern for inserting idle cycles for the cache memory. The different pattern may include a different number of idle cycles than the particular pattern.

In some embodiments, to maintain the power credit approach, the power management circuit may, receive an allotment of a number of power credits. The power management circuit may increase the current number of available power credits by the received number of power credits. Based on power consumption values of the plurality of processor cores and the plurality of banks, the power management circuit may decrement the current number of available power credits.

BRIEF DESCRIPTION OF THE DRAWINGS

The following detailed description makes reference to the accompanying drawings, which are now briefly described.

Figure 1A:
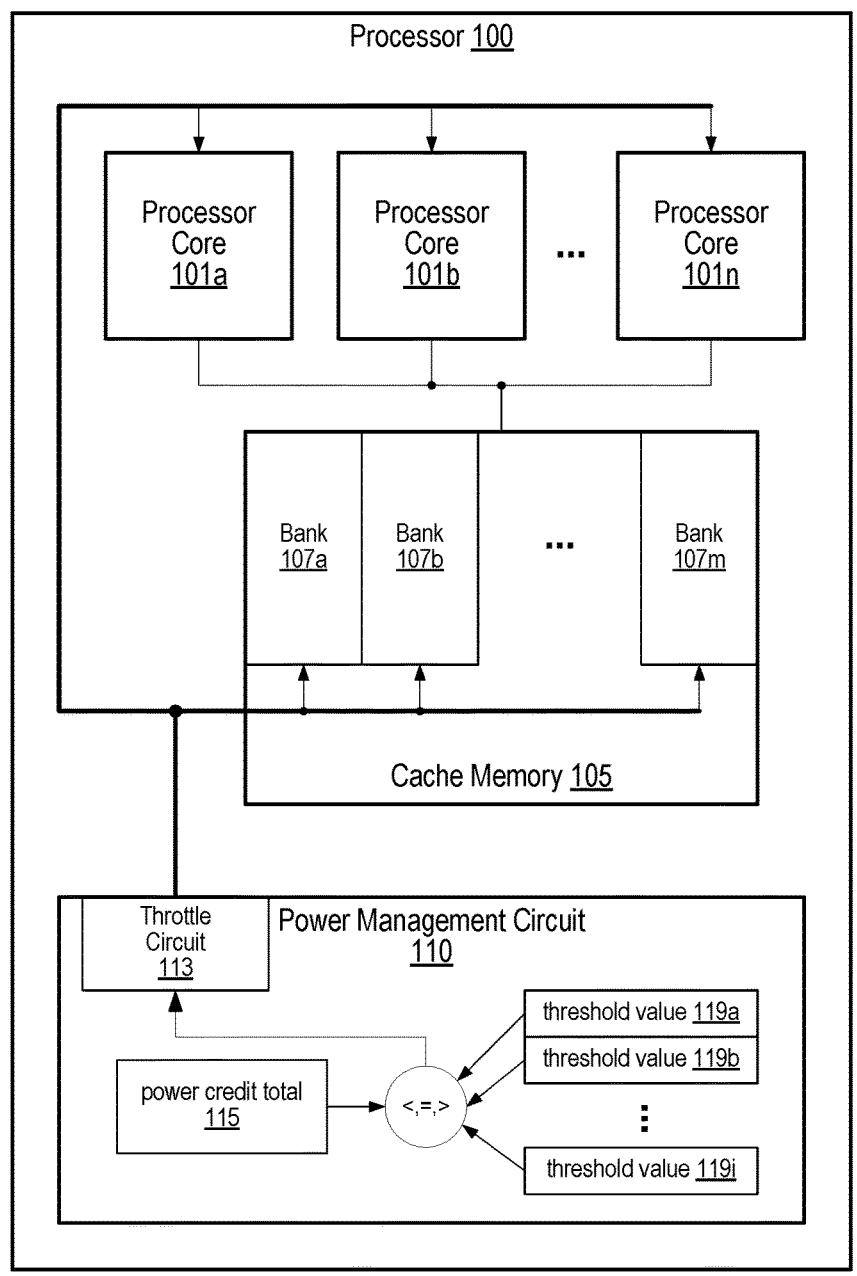
FIG. 1A illustrates a block diagram of an embodiment of a processor circuit that includes a power management circuit.

While the disclosure is susceptible to various modifications and alternative forms, specific embodiments thereof are shown by way of example in the drawings and will herein be described in detail. It should be understood, however, that the drawings and detailed description thereto are not intended to limit the disclosure to the particular form illustrated, but on the contrary, the intention is to cover all modifications, equivalents and alternatives falling within the spirit and scope of the present disclosure as defined by the appended claims. As used throughout this application, the word "may" is used in a permissive sense (i.e., meaning having the potential to), rather than the mandatory sense (i.e., meaning must). Similarly, the words "include," "including," and "includes" mean including, but not limited to.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. § 112, paragraph (f) interpretation for that unit/circuit/component. More generally, the recitation of any element is expressly intended not to invoke 35 U.S.C. § 112, paragraph (f) interpretation for that element unless the language "means for" or "step for" is specifically recited.

As used herein, the term "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. The phrase "based on" is thus synonymous with the phrase "based at least in part on."

DETAILED DESCRIPTION OF EMBODIMENTS

Power management circuits (also referred to as power management units or PMUs) may be used to manage power usage in computing systems, including systems-on-a-chip (SoCs). Such power management circuits may track power usage and enable one or more actions if power consumption levels are nearing a particular limit. Various actions may be taken to adjust operating parameters in a computing system to select between increased performance and reduced power consumption. For example, power management circuits may adjust a voltage level of a power supply signal and a frequency of a clock signal in the computing system. These actions may, however, impact a large portion of the computing system. In some cases, having a capability to adjust performance levels in more localized circuits may be desirable.

In a multicore processor, power management circuits may be capable of adjusting a clock signal frequency and/or a power signal voltage to one or more cores for a period of time. By adjusting power usage of a subset of cores, some cores may be allowed to operate at full power to complete high-priority tasks, while cores executing lower-priority tasks are restricted to reduce power consumption. In some cases, however, most, or even all, cores may be executing processes with similar priorities or processes related to a same task. In these cases, identifying one or more low-priority cores for restricting power consumption may not be practical.

For example, a multicore processor may be utilized in a neural computing system for accelerating artificial intelligence tasks including, for example, facial recognition, speech recognition, and other types of machine learning operations. While such operations may be accomplished with a general-purpose processor and software, performance and power consumption may be improved utilizing a specialized processor architecture that is configured to perform machine learning operations more efficiently than the general-purpose processor. Facial recognition, for example, may be used as a user authentication operation to unlock a computing device such as a personal computer, smartphone, tablet computer and the like. During a facial recognition operation, most or all cores of the neural processor may be utilized to identify points on an image corresponding to particular facial features, determine particular characteristics of the identified features, and compare these characteristics to a database of approved users of the computing device. If all cores of the neural processor are utilized in this operation, then all cores may be performing tasks of equal priority towards completing the facial recognition operation. If this operation occurs at a time when the computing device has reached a particular power usage threshold, then the neural processor may need to be throttled to avoid the computing device from exceeding an established power budget.

Accordingly, methods are desired for spreading power conservation actions across a group of cores without favoring any one particular core over another. In addition, methods that enable a finer granularity for throttling particular circuits within a computing device or an SoC are desired. A combination of throttling portions of a processor while evenly spreading performance restrictions across a group of processing cores may provide an improved capability for managing power consumption of a computing device while mitigating performance degradation of the device during periods of operation in a reduced power state.

Embodiments of systems and methods power management of a multicore computing system are disclosed herein. The disclosed embodiments demonstrate methods for maintaining a power credit model for the system that includes tracking a total number of available power credits. In response to the total number of available power credits reaching a particular one of a plurality of threshold values, a power management circuit may perform one or more throttling actions associated with this particular threshold value. Throttling actions include selectively throttling one or more of a plurality of processor cores, as well as selectively throttling one or more of a plurality of banks in a cache memory. As used herein, "throttling" refers to limiting a performance level of a circuit in order to reduce an amount of power the circuit is consuming.

A block diagram for an embodiment of a processor circuit is illustrated in FIG. 1A. Processor circuit 100 includes processor cores 101a through 101n (collectively referred to as processor cores 101), coupled to cache memory 105 and power management circuit 110. Cache memory 105 includes banks 107a-107m (collectively banks 107). Power management circuit 110 includes throttle circuit 113, power credit total 115, and threshold values 119a-119i (collectively threshold values 119). In various embodiments, processor circuit 100 may be implemented as a standalone integrated circuit (IC), one of a plurality of processors in an SoC, or comprised of multiple ICs on a circuit board. Processor circuit 100 may be included as part of a computer system.

Processor cores 101, as shown, are each configured to retrieve and execute instructions from cache memory 105 and/or from other memories associated with processor circuit 100, but not shown in FIG. 1A. In various embodiments, processor cores 101 may be homogeneous or heterogeneous. Processor cores 101 may implement any suitable instruction set architecture (ISA), such as, e.g., ARM™, PowerPC®, Blackfin®, or x86 ISAs, or combination thereof. In some embodiments, one or more of processor cores 101 may be a specialized core such as a floating-point processor, a digital-signal processor, or the like. Each of processor cores 101 may be capable of executing an instruction or a portion of an instruction on each cycle of a received core clock signal.

It is noted that the concept of instruction execution is broad and may refer to 1) processing of an instruction throughout an execution pipeline (e.g., through fetch, decode, execute, and retire stages) and 2) processing of an instruction at an execution unit or execution subsystem of such a pipeline (e.g., an integer execution unit or a load-store unit). As used herein, instruction "execution" or "executing" an instruction refers to the latter meaning. Thus, "executing" an add instruction refers to adding two operands to produce a result, which may, in some embodiments, be accomplished by a circuit at an execute stage of a pipeline (e.g., an execution unit).

Cache memory 105 includes circuits for managing memory transactions issued by processor cores 101. Memory transactions may include read, write, and modify types of requests. As illustrated, cache memory 105 receives memory transactions, and determines if valid content corresponding to an addressed location is currently in one or more of banks 107, or if this data is to be fetched from other memories or storage devices (not shown). In some embodiments, processor circuit 100 may include more than one cache memory 105—for example, one cache memory 105 for every two processor cores 101.

In response to receiving one or memory transactions from processor cores 101, cache memory 105 prioritizes the received memory transactions and determines which of banks 107 will be used to fulfill the current prioritized memory transaction. A memory transaction may be assigned to a particular one of banks 107 on each cycle of a received cache clock signal. The core clock signal and the cache clock signal may be synchronous, for example, the clock signals may be generated from a common clock source. In some embodiments, the two clock signals may have a same frequency.

Power management circuit 110, as illustrated, maintains a power credit approach for processor circuit 100 that includes tracking a total number of currently available power credits. As used herein, the "power credit approach" (also referred to herein as a "power credit model") refers to a power management process for a processor in which a power management circuit receives allotments of power credits that are then decremented or "spent" based on an amount of energy that the processor uses or is estimated to have used.

As used herein, a "credit" refers to a value that corresponds to some amount of power usage. Consider, for example, a circuit that is designed to consume 250 milliwatts (mW) during a particular time period (e.g., one or more system clock cycles). Suppose that the circuit is given an overall power credit budget of 10 credits for each time period; each credit thus corresponds to roughly 10% of the overall budget or 25 mW each. Power management may thus be performed by monitoring power usage of various sub-circuits and determining an equivalent number of power credits that correspond to the monitored usage. By comparing a number of credits used to a number of credits allowed, a power management circuit may throttle some or all of the sub-circuits to keep the power usage of the circuit within the allotted budget. Power management may thus be performed by communicating to constituent parts of the circuit how many power credits that part of the circuit is allocated for the current time period. A credit, therefore, refers to a value that is understood by both the credit allocator and the circuit to which power is being allocated, to refer to a specified amount of power usage.

Various procedures for accumulating and spending power credits are known. As illustrated, power management circuit 110 receives an allotment of power credits periodically (e.g., after a particular number of clock cycles) and adds the allotment to the total number of currently available power credits, shown in FIG. 1A as power credit total 115. The number of power credits in a given allotment may be fixed or may vary dependent on power usage of a computing system that includes processor circuit 100. A number of power credits are spent (e.g., decremented from power credit total 115) based on power usage by the circuits of processor circuit 100. In various embodiments, the power usage may be determined based on voltage and/or current measurements of power supply signals, based on estimates of an amount of activity within processor circuit 100, or based on combinations thereof.

As shown, power management circuit 110 stores a plurality of threshold values (threshold values 119), each of threshold values 119 associated with one or more of a plurality of throttling actions. Threshold values 119 are stored in suitable storage circuits, e.g., registers or a random-access memory (RAM) such as a static RAM (SRAM). Threshold values 119 correspond to respective numbers of power credits. In response to power credit total 115 (that is, the current total of all allocated power credits) reaching a particular one of threshold values 119, power management circuit 110 uses throttle circuit 113 to perform the one or more throttling actions associated with the particular threshold value 119. The plurality of throttling actions includes selectively throttling one or more of processor cores 101, and selectively throttling one or more of banks 107 in cache memory 105.

To selectively throttle one or more of processor cores 101, power management circuit is configured to, in response to reaching the particular one of threshold values 119, determine a particular order for stalling the plurality of processor cores. This particular order may include all or a portion of processor cores 101. As part of the throttling actions, power management circuit 110 then selects, according to the particular order, a particular one of processor cores 101 to stall for a next clock cycle. Power management circuit 110 then selects, according to the particular order, a next processor core to stall for a subsequent clock cycle. For example, one particular order may include selecting processor core 101*a* to stall in a first clock cycle and then selecting processor core 101*b* to stall in a second, subsequent clock cycle while returning processor core 101*a* to an active state in the second clock cycle. This pattern may continue with different processor cores 101 being selected each clock cycle until a last core, processor core 101*n*, is selected. In a following clock cycle, processor core 101*a* may be selected again and the particular order repeated.

For any one particular order, any number of processor cores 101 may be stalled in a given clock cycle. For example, in an eight-core processor, two cores may be stalled in each cycle, with a different two cores selected in each cycle. Such an order might, in some embodiments, result in a 25% power reduction in the processing cores by stalling two of eight cores in each cycle. The particular order may be repeated once all cores have been stalled for a respective clock cycle. In some embodiments, however, the order may be altered or dithered for each iteration to avoid causing a pattern in the power supply signals. For example, if processor core 101*a* is stalled every eight clock cycles, a power signal to processor core 101*a* might develop a harmonic noise pattern with a frequency that is one eighth of the clock signal frequency. Such a harmonic noise pattern could interfere with other circuits in processor circuit 100.

As illustrated, to selectively throttle one or more of banks 107 in cache memory 105, power management circuit 110 is configured to, in response to reaching the particular one of threshold values 119, determine a particular pattern for inserting idle cycles for cache memory 105. The pattern, for example, may be a binary value of a suitable number of bits, each bit representing one cycle of a cache memory clock signal. A value of '1' in a particular bit may correspond to a normal clock cycle while a value of '0' may correspond to an idle cycle. In other embodiments, the polarity of the bits may be reversed. As used herein, "inserting an idle cycle" refers to asserting an indication for an idle cycle for one cycle of the cache memory clock signal. This indication may, for example, be an assertion of particular control signal that causes the cache memory to cease an assignment of a next memory request waiting to be assigned.

Based on the particular pattern, power management circuit 110 asserts an indication for an idle cycle. In response to detecting an indication for an idle cycle, cache memory 105 stalls an assignment of a memory request to a respective one of banks 107. In various embodiments, the stalled memory request may be re-entered into an arbitration circuit to be reprioritized among other received memory requests, or may be held and assigned during a next non-idle cycle. By stalling the memory request assignment during the idle cycle, the particular one of banks 107 is effectively stalled for the idle cycle, thereby reducing power consumption in cache memory 105 since one of the banks is not active. For different threshold values, a different number of idle cycles may be included in the respective pattern. In various embodiments, the pattern may include any suitable number of total clock cycles. For example, a given pattern may include sixteen total clock cycles with eight idle cycles interspersed throughout the sixteen total clock cycles. After sixteen clock cycles, the pattern may repeat. In some embodiments, the pattern may be dithered after each iteration to avoid causing a harmonic noise pattern in a power supply signal to cache memory 105.

It is noted that, as used herein, "to dither" or "dithering" refers to a process of varying or randomizing an order or pattern. Dithering operations described herein may include, for example, varying an order in which processor cores are stalled. For example, an order for stalling for processor cores may be "ABCD." Dithered orders may include "ACDB" or "BACD." Similarly, a pattern for inserting idle cycles may be "11011011," where "1" indicates a normal cycle and "0" indicates an idle cycle. Dithered patterns may include "10111101" or "11101101." Note that in the ordering example, the same four cares are used, and in the pattern example, the same number of 1's and 0's are used.

In some embodiments, the throttling actions may include reducing a frequency of one or more clock signals that are used by the plurality of processing cores and the cache memory. In other embodiments, the throttling actions may further include reducing a voltage level of one or more power signals used by the plurality of processing cores and the cache memory. These additional actions may be enabled instead of, or in addition to, throttling processor cores 101 and/or throttling banks 107. For example, in response to reaching a particular one of threshold values 119, power management circuit 110 may enable stalling of one processor core 101 each clock cycle, insertion of four idle cycles into a series of sixteen cache memory clock cycles, and a 25% reduction in the frequency of a clock signal used by processor circuit 100. Utilizing multiple throttling actions in such a fashion may, in some cases, reduce power consumption of processor circuit 100 by a suitable amount while maintaining performance of processor circuit 100 at a tolerable level for a user of the computer system.

It is noted that processor circuit 100 as illustrated in FIG. 1A is merely an example. The illustration of FIG. 1A has been simplified to highlight features relevant to this disclosure. Various embodiments may include different configurations of the circuit blocks, including additional circuit blocks, such as circuits for determining energy usage. Power management circuits may be incorporated into processor circuits in various manners. While FIG. 1A illustrates one embodiment, several additional embodiments are shown in FIGS. 1B-1E.

Figure 1B:
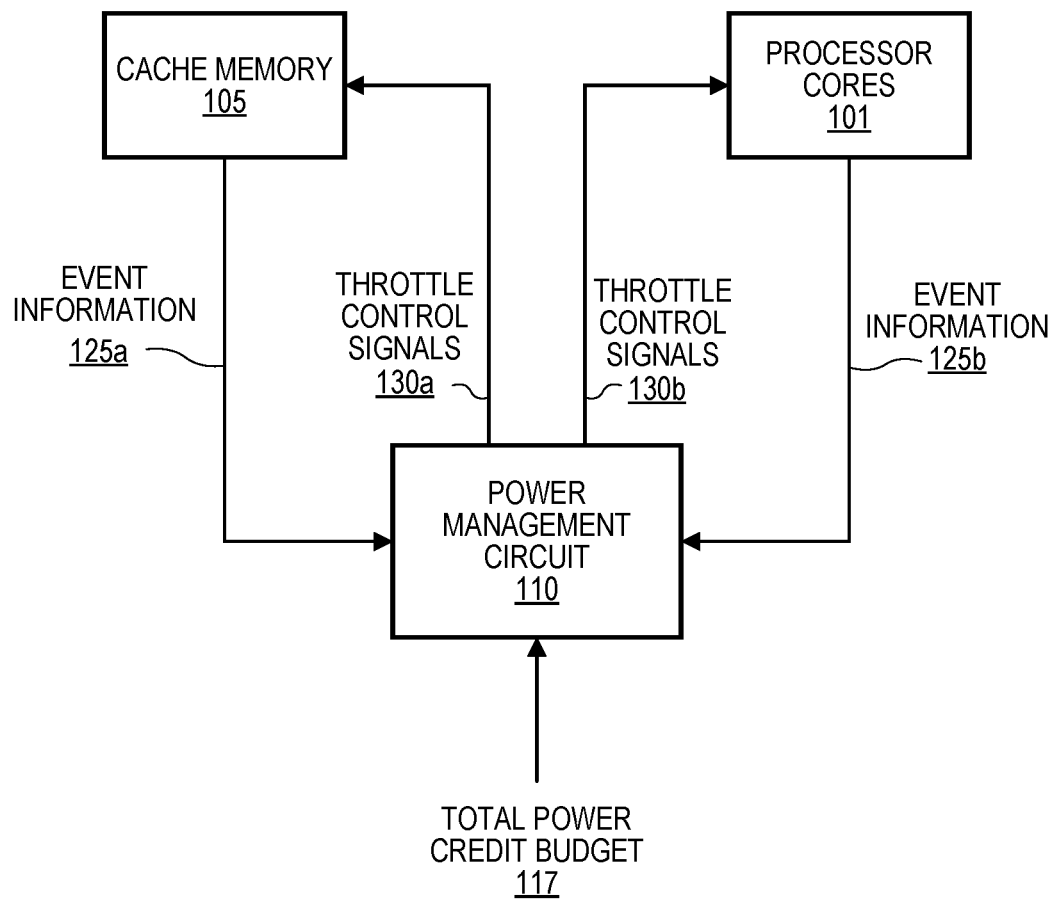
FIG. 1B shows a block diagram of another embodiment of a processor circuit that includes a power management circuit.

To further illustrate the power management operation of processor circuit 100, a simplified block diagram of processor circuit 100 is illustrated in FIG. 1B. As illustrated, processor circuit 100 includes power management circuit 110 coupled to processor cores 101 and cache memory 105. Power management circuit 110 receives event information 125*a* from cache memory 105 and event information 125*b* from processor cores 101. The event information 125 corresponds to operating information for the respective circuit blocks. For example, event information 125*a* may include indications of a number of cache transactions being performed by cache memory 105, a number of banks 107*a*-107*m* that are active, and general power mode state information including power supply voltage level and clock signal frequency information. Event information 125*b* may include power state information such as operating modes for each processing core 101*a*-101*n*, as well as similar voltage level and clock frequency information. Power management circuit 110, in the illustrated embodiment, uses event information 125*a* and 125*b* to determine an amount of energy used, in terms of power credits, by cache memory 105 and processor cores 101, respectively. Power management circuit 110 deducts the determined amount of used power credits from a received total power credit budget 117. Based on the remaining available power credits, power management circuit asserts various throttling actions on cache memory 105 using throttle control signals 130a and on processing cores 101 using throttle control signals 130b.

Figure 1C:
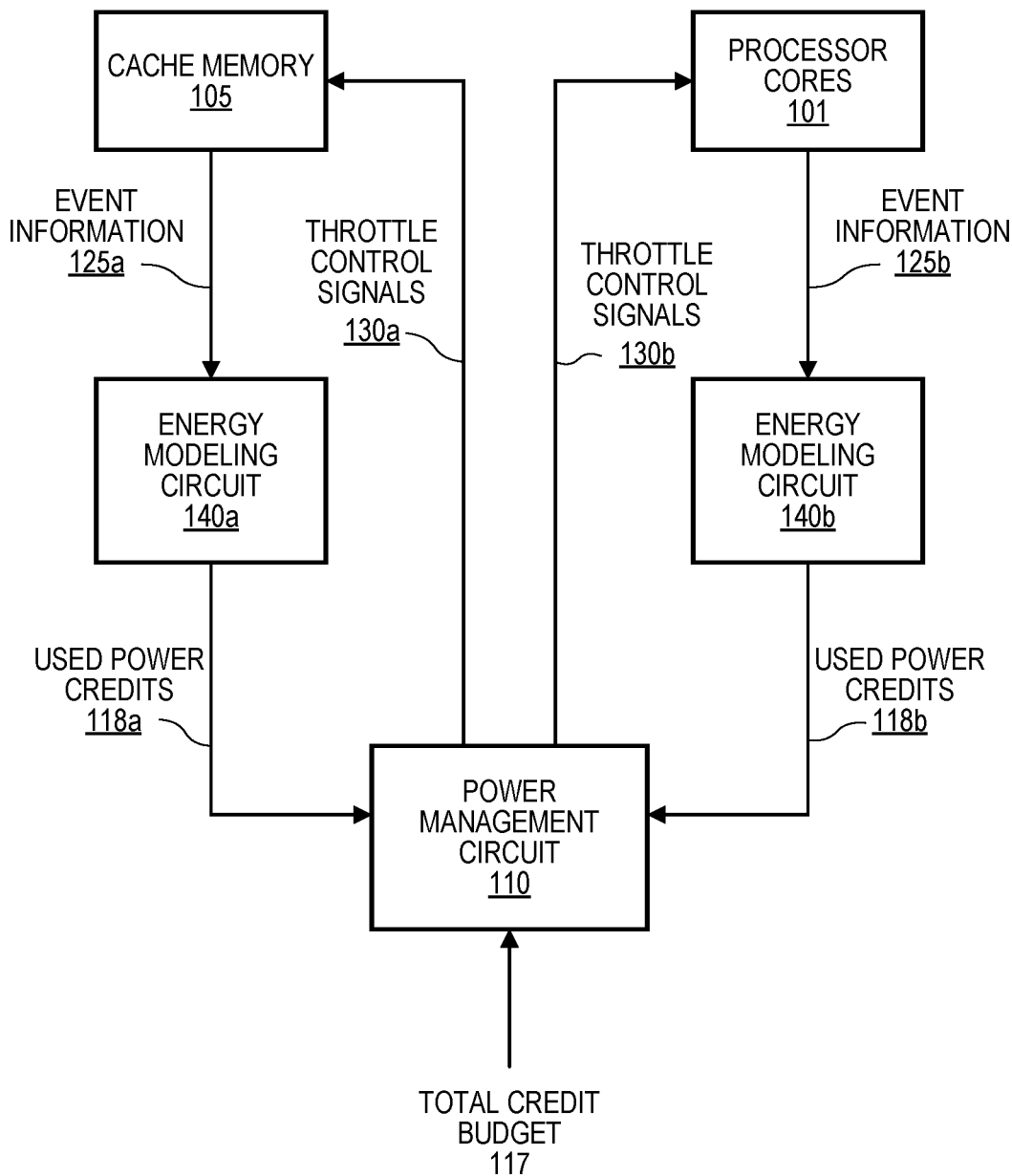
FIG. 1C depicts a block diagram of an embodiment of a processor circuit that includes a power management circuit and energy modelling circuits.

As noted above, the power management circuits included a processor circuit may be implemented in a variety of ways. A particular embodiment of processor circuit 100 that employs energy modeling circuits is depicted in FIG. 1C. As illustrated, processor circuit 100 includes energy modeling circuits 140a and 140b that are configured to receive event information 125a and 125b, respectively. Energy modelling circuit 140a, as shown, includes information specific to cache memory 105, such values corresponding to leakage currents in cache memory 105 for various combinations of power supply voltage levels and operating temperatures. Using this specific information and the received event information 125a, energy modeling circuit 140a may generate weighted estimates for a total energy consumption by cache memory 105 and use these weighted estimates to generate used power credits 118a. In a similar manner, energy modelling circuit 140b includes information specific to processing cores 101, and uses this specific information and event information 125b, to generate weighted estimates for a total energy consumption by processor cores 101. These weighted estimates are used by energy modeling circuit 140b to generate used power credits 118b. Power management circuit 110 may then utilize used power credits 118a and 118b to generate throttle control signals 130a and 130b, respectively, to apply selected throttling actions to cache memory 105 and processor cores 101.

Figure 1D:
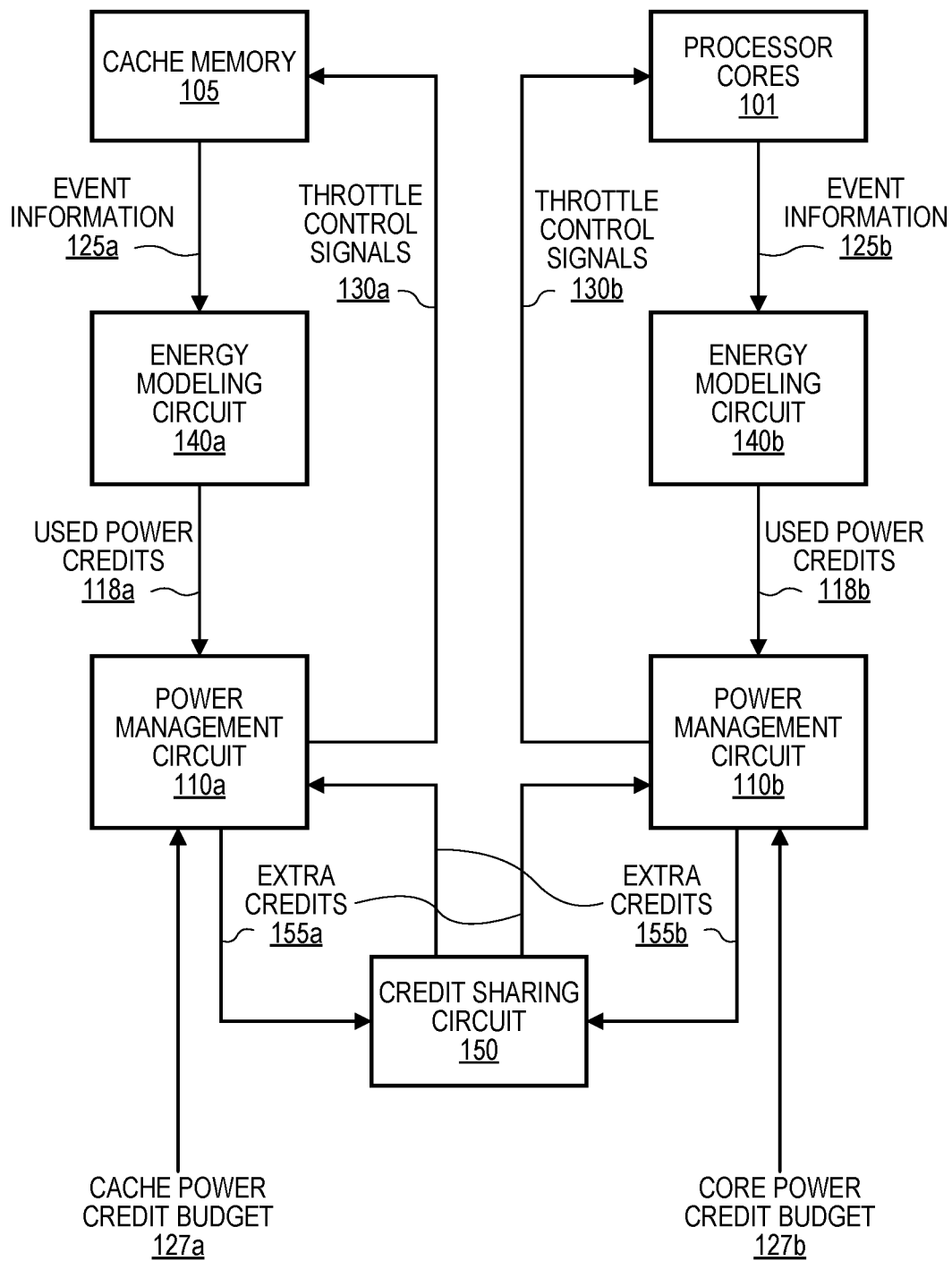
FIG. 1D presents a block diagram of an embodiment of a processor circuit that includes separate energy modeling circuits and power management circuits.

Moving now to FIG. 1D, an embodiment of processor circuit 100 is presented that employs separate power management circuits, 110a and 110b, for cache memory 105 and processing cores 101, respectively. In the embodiment of FIG. 1D, instead of a single total power credit budget, separate budgets are received in the form of cache power credit budget 127a and core power credit budget 127b. Power management circuit 110a receives cache power credit budget 127a and used power credits 118a to determine throttling actions for cache memory 105. Power management circuit 110b performs similar tasks to determine throttling actions for processing cores 101. Since cache memory 105 and processing cores 101 receive individual power credit budgets, either circuit block may have extra power credits at a given point in time. If processor cores 101 has unused power credits, then power management circuit 110b may send a number of extra credits 155b to credit sharing circuit 150. Similarly, power management circuit 110A may send extra credits 155a to credit sharing circuit 150 when cache memory 105 has extra credits. Credit sharing circuit 150 may distribute the received extra credits to power management circuit 110a or 110b as needed. Credit sharing circuit 150 may be implemented according to one of a variety of design styles. For example, credit sharing circuit 150 may be implemented as a pair of queues or shift registers, for example, as a pair of asynchronous first-in, first-out (FIFO) queues. These FIFO queues may be arranged such that one FIFO receives extra credits 155b and sends them to power management circuit 110a, and vice versa for the other FIFO.

Figure 1E:
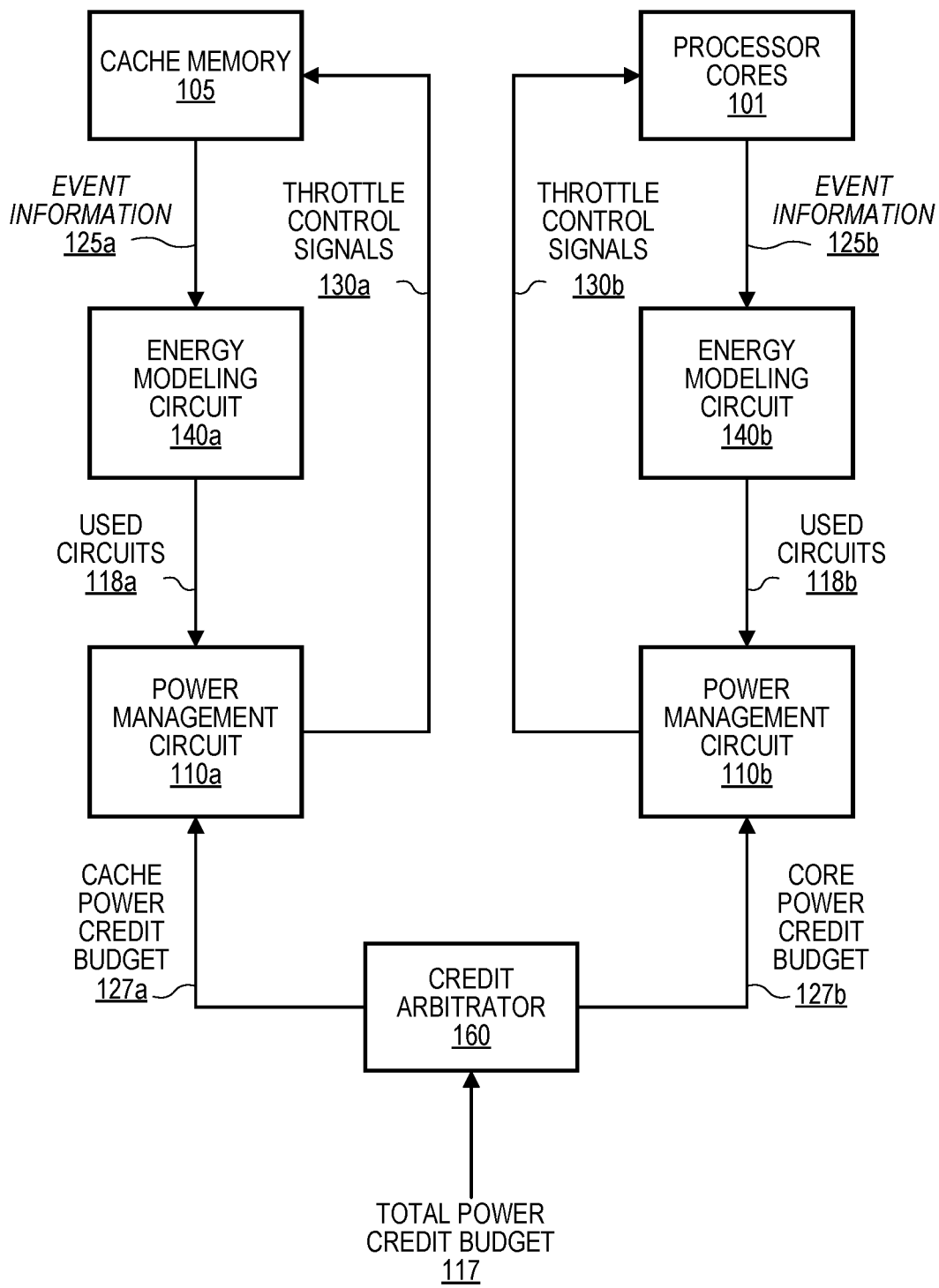
FIG. 1E illustrates a block diagram of another embodiment of a processor circuit that includes separate energy modeling circuits and power management circuits.

Proceeding to FIG. 1E, an additional embodiment of processor circuit 100 is illustrated. The embodiment of FIG. 1E is similar to the embodiment of FIG. 1D, with separate power management circuits 110a and 110b for cache memory 105 and processor cores 101, respectively. Instead of separate power credit budgets for cache memory 105 and processor cores 101, total power credit budget 117 is received by credit arbitrator 160. Total power credit budget 117 includes a credit budget for cache memory 105 and processor cores 101 combined. Using one or more criteria, credit arbitrator 160 allocates a number of credits in total power credit budget 117 between cache power credit budget 127a and core power credit budget 127b. As described above, power management circuits 110a and 110b determine throttling actions for cache memory 105 and processor cores 101, respectively, based on these allocations.

Figure 2:
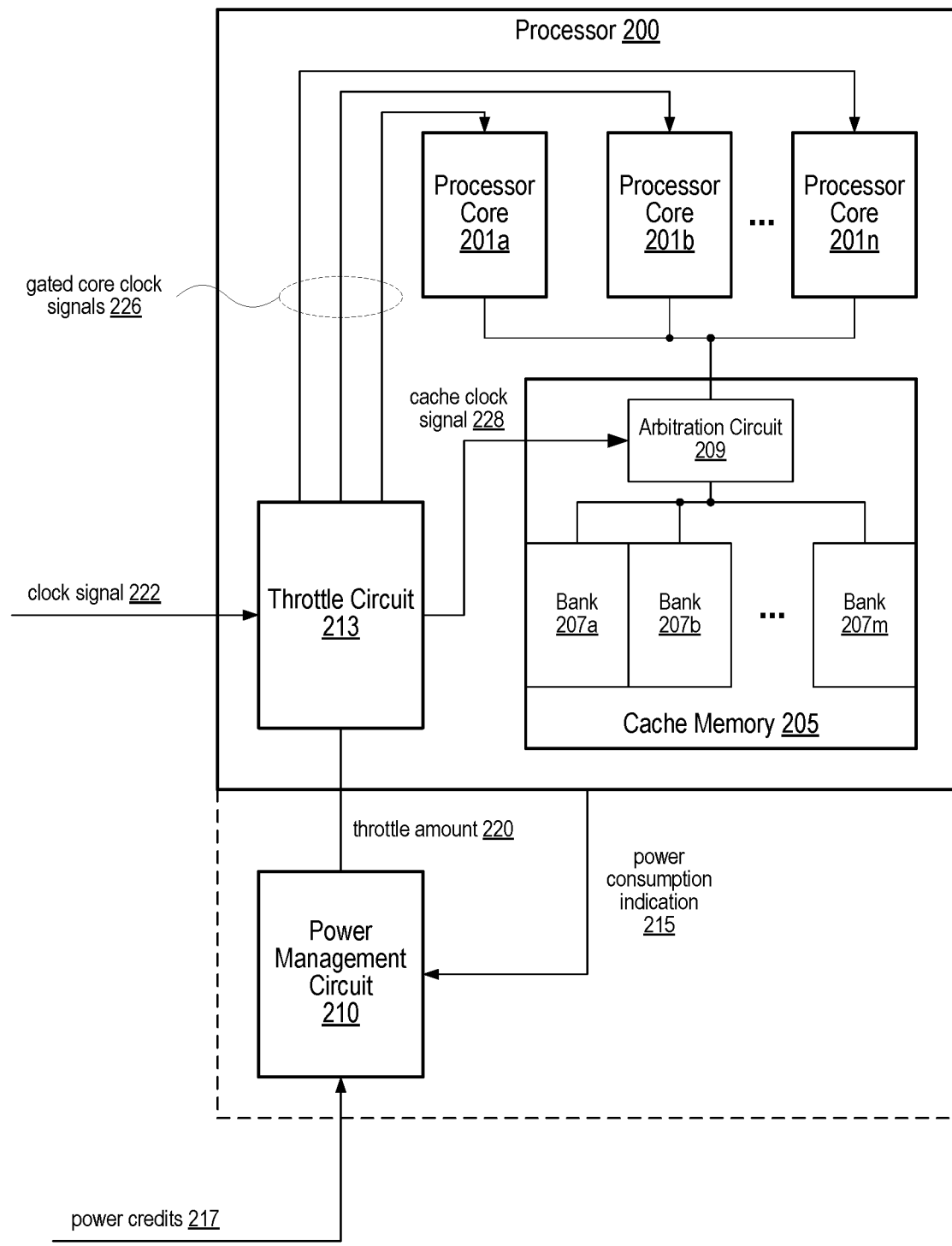
FIG. 2 shows a block diagram of an embodiment of another processor circuit coupled to a power management circuit.

As shown above in FIGS. 1A-1E, the implementation of processor circuit 100 may be achieved using a variety of circuit designs. A further embodiment is shown in FIG. 2. The embodiment of FIG. 2, as well as subsequent embodiments, may include any suitable combination features as described above in FIGS. 1A-1E.

Moving to FIG. 2, a block diagram for an embodiment of another processor circuit is shown. Processor 200 includes processor cores 201a-201n (collectively referred to as processor cores 201), cache memory 205, and throttle circuit 213. Cache memory 205 includes banks 207a-207n (collectively banks 207) and arbitration circuit 209. Processor 200 is coupled to power management circuit 210.

Processor 200 may, in some embodiments, be a neural processor used in a computer system to perform tasks that include complex computations, such as artificial intelligence tasks. For example, processor 200 may be used to analyze a camera image to perform a facial recognition operation, or to evaluate an audio stream to interpret one or more voice commands. Such tasks may be divided into a plurality of smaller processes that can be performed in parallel by a plurality of processor cores such as processor cores 201. These smaller processes may contribute to a common decision point, and therefore, a result may be needed from each contributing processor core 201 before the decision can be made. Throttling performance in processor 200, therefore, may require evenly distributing throttling actions across each of processor cores 201 that are contributing to the common decision point.

As processor cores 201 perform various tasks, they may generate a plurality of memory requests that are initially received by cache memory 205. These memory requests may be received in any order from processor cores 201. As illustrated, arbitration circuit 209 receives each of the plurality of memory requests, prioritizes unfulfilled memory requests, and then arranges the waiting memory requests in a prioritized order to be fulfilled. The prioritization may be based on a variety of parameters, such as an order in which a memory request is received, which one of processor cores 201 sent the memory request, how many memory requests remain unfulfilled for a given one of processor cores 201, an availability of a particular one of banks 207 to fulfill the memory request, and other similar parameters.

Cache memory 205 processes the memory requests in the prioritized order. For a current selected memory request, cache memory 205 determines whether a valid cache line in one of banks 207 corresponds to an address included in a particular memory request. If a valid cache line does correspond to the address, then the memory request is fulfilled using this cache line. Otherwise, if a different cache line is available, then the available cache line may be associated with the address and then used to fulfill the memory request. As shown, each of banks 207 includes a plurality of cache lines. Each cache line is associated with a respective subset of addresses used in a much larger system memory in the computer system. Accordingly, a particular address included in a particular memory request may be mapped to a subset of banks 207. In some embodiments, the particular address may be mapped to a single one of banks 207.

Of the throttling actions that may be taken to reduce power consumption in processor 200, one such action may include idling one or more of banks 207 in cache memory 205. Since each one of banks 207 may be mapped to particular system memory addresses, idling a same one of banks 207 for multiple clock cycles may, in some embodiments, unevenly reduce performance for particular ones of processor cores 201 that have issued memory requests for the addresses mapped to an idled one of banks 207. For example, if processor core 201b is executing a process that frequently accesses one or more addresses that are mapped to bank 207a, then idling bank 207a may cause delays for processor core 201b as the memory requests to the one or more addresses are fulfilled using higher levels of memory that may take longer to access. If the other processor cores 201 are not accessing idled ones of banks 207, then these other processor cores may complete their respective processes sooner than processor core 201b. If, as described above, the processor cores 201 are all contributing to a common decision point, then this decision is delayed until processor core 201b completes its respective process. Throttling of banks 207, therefore, may benefit from evenly distributing throttling actions across each of banks 207.

As illustrated, power management circuit 210 tracks power usage by processor 200. To track power usage, power management circuit 210 receives a number of power credits 217 that are allotted to processor 200. Power credits 217 may be sent to power management circuit by other power managing circuits in the computer system on a regular interval (e.g., every cycle or every 10 cycles) or on an irregular interval (e.g., based on overall computer system power usage at a given point in time). Power management circuit 210 increases a total number of power credits by the allotted number of power credits 217. Power management circuit 210 also decrements the total number of power credits based on energy values that are indicative of power consumption of processor cores 201 and banks 207.

To determine a number of power credits to decrement from the total, power management circuit 210 determines or estimates (or a combination thereof) an amount of energy that processor 200 is using based on information received via power consumption indication 215. In various embodiments, power consumption indication 215 may include any suitable number of signals and may include digital, analog, or a combination of types of signals. For example, power consumption indication 215 may include analog signals representing voltage levels and/or current values associated with power signals within processor 200. Other signals that may be included in power consumption indication 215 include digital signals that may provide information such as a current operating mode of processor 200, a frequency of one or more clock signals (e.g., clock signal 222), and the like. In some embodiments, voltage levels and/or current values may be converted into digital values before being sent via power consumption indication 215. Using the information received via power consumption indication 215, power management circuit 210 determines a number of power credits that correspond to the amount of energy used by processor 200, and decrements the total number of power credits by this determined number.

At any given point in time, power management circuit 210 may compare the total number of currently available power credits to a plurality of threshold values (e.g., threshold values 119 in FIG. 1A). Based on a current value of the total number of power credits reaching a particular threshold value of the plurality of threshold values, power management circuit 210 performs one or more throttling actions associated with the particular threshold value. As shown, power management circuit 210 utilizes throttle circuit 213 to implement these one or more throttling actions. These throttling actions may include throttling, in an iterative fashion, individual ones of processor cores 201, and may include throttling, in an iterative fashion, individual ones of banks 207.

Throttle circuit 213 receives throttle amount 220 from power management circuit 210. Power management circuit 210 generates throttle amount 220 based on which of the plurality of thresholds the total number of power credits has reached. If no threshold value has been reached, the throttle amount 220 may correspond to a default value that indicates that no throttling actions are to currently be implemented. Throttle amount 220 includes one or more signals used to cause throttle circuit 213 to enable a selected one or more throttling actions. Throttle circuit 213 also receives clock signal 222 which is used to generate gated core clock signals 226 and cache clock signal 228. Based on a current value of throttle amount 220, throttle circuit 213 may disable one or more of gated core clock signals 226 and/or insert one or more idle cycles into cache clock signal 228. The value of throttle amount 220 may change as the total number of currently available power credits changes and reaches a different threshold value. Based on a changed value of throttle amount 220, throttle circuit 213 may enable or disable various throttling actions. For example, power management circuit 210 may, in response to reaching at least one threshold value of the plurality of threshold values, throttle at least one of processor cores 201 and at least one of banks 207 in a same clock cycle.

In order to throttle the individual ones of processor cores 201 in an iterative fashion, power management circuit 210 may determine a particular order for stalling processor cores 201. Power management circuit 210 selects, according to the particular order, a particular one of processor cores 201 to stall for a next clock cycle, and then, according to the particular order, selects a next processor core to stall for a subsequent clock cycle. For example, if one of processor cores 201 is to be stalled in each cycle of clock signal 222, then power management circuit 210 determines an order in which processor cores 201 are to be stalled in subsequent cycles. Processor cores 201 may be stalled starting with processor core 201a in a first cycle, processor core 201b in a second cycle, proceeding through to processor core 201n. If the current threshold level remains unchanged, then the pattern may be repeated after each of processor cores 201 has been stalled.

In some embodiments, however, the order may be varied or dithered to avoid creating a harmonic pattern on power signals supplying power to each of processor cores 201. For example, circuits corresponding to each of processor cores 201 may be located in various physical locations on an IC that includes processor 200. A subset of processor cores 201 may be located next to one another and may, therefore, consume power from a same physical wire or set of wires. If this subset of processor cores 201 is repeatedly stalled in a same order, the fluctuations in current that result from the stalls may create corresponding fluctuations in a voltage level on the wire. This fluctuating voltage level may result in a harmonic noise waveform being created on the wire. Such harmonic noise may disrupt or otherwise result in improper operation of other circuitry near the wire. To avoid generating harmonic noise, each iteration of the particular order may be dithered, thereby avoiding a repetitive pattern of core stalls. For example, a linear-feedback shift register may be utilized for dithering the current core stalling order for each iteration of the current pattern. Additional details regarding dithering the pattern for each iteration are provided below.

If the present threshold level changes during a particular iteration of a currently selected core stalling pattern, then a new pattern may be applied after completion of the particular iteration. Power management circuit 210, for a different threshold value, determines a different order for stalling the plurality of processor cores. The different order may include stalling more than one of processor cores 201 in each cycle of clock signal 222. For example, four of processor cores 201 may be stalled in each cycle of clock signal 222 during this different order. Based on the different order, power management circuit 210 selects two or more processor cores to stall for a next clock cycle. In some embodiments, if two or more of processor cores 201 are to be stalled in each cycle, then power management circuit 210 may gradually increase the number of processor cores 201 stalled in each cycle. For example, if the determined order changes from stalling one core per cycle to stalling four cores per cycle, then in a first cycle of the new order, one addition processor core 201 may be stalled in addition to a particular one processor core 201 that was stalled in the previous cycle. In a subsequent cycle, a third one of processor cores 201 is stalled, and then a fourth one of processor cores 201 in a following cycle. Once four of processor cores 201 are stalled in a given cycle, then in each subsequent cycle a previously stalled core may be enabled and a previously enabled core may be stalled to replace the newly enabled core.

In order to throttle individual banks of banks 207 in cache memory 205, power management circuit 210 may, in response to reaching the particular threshold value, determine a particular pattern for inserting idle cycles for cache memory 205. As illustrated, power management circuit 210 then asserts, based on this particular pattern, an indication for an idle cycle. In response to detecting the indication for the idle cycle, cache memory 205 stalls an assignment of a memory request to a respective one of banks 207. The particular pattern is based on a binary value that includes a particular number of data bits. Each data bit represents a respective cache clock cycle with, for example, a bit value of '1' corresponding to a normal cache clock cycle and a value of '0' corresponding to an idle cycle. Any suitable number of data bits/cache clock cycles may be included in the pattern. One pattern, for example, may include sixteen data bits for sixteen cache clock cycles, with two data bits of value '0' being inserted among the sixteen data bits to indicate two idle cycles.

A change in the total number of power credits may result in the total number of power credits reaching a different one of the plurality of threshold values. Power management circuit 210 may, in response to reaching the different threshold value, determine a different pattern for inserting idle cycles for the cache memory. This different pattern may include a different number of idle cycles than the particular pattern above.

Power management circuit 210 selects various throttling actions based on which of a plurality of threshold values is satisfied by a current number of power credits available to processor 200. By mapping each of the plurality of threshold values to a particular combination of core stalling and cache memory idle cycles, power management circuit 210 may be capable of throttling power consumption by processor 200 by various amounts. The range of throttling options may provide an ability for power management circuit 210 to select an appropriate level of throttling that allows processor 200 to satisfy a power consumption limit while maintaining an acceptable performance level.

It is noted that the processor of FIG. 2 is an example used to describe the disclosed concepts. It is contemplated that the disclosed concepts may be applied to a variety of functional circuits. Accordingly, suitable embodiments are not limited to processors performing artificial intelligence types of tasks. Embodiments illustrated in both FIG. 1A and FIG. 2 have included power management circuits and throttle circuits. One example of such circuits is provided in FIG. 3.

Figure 3:
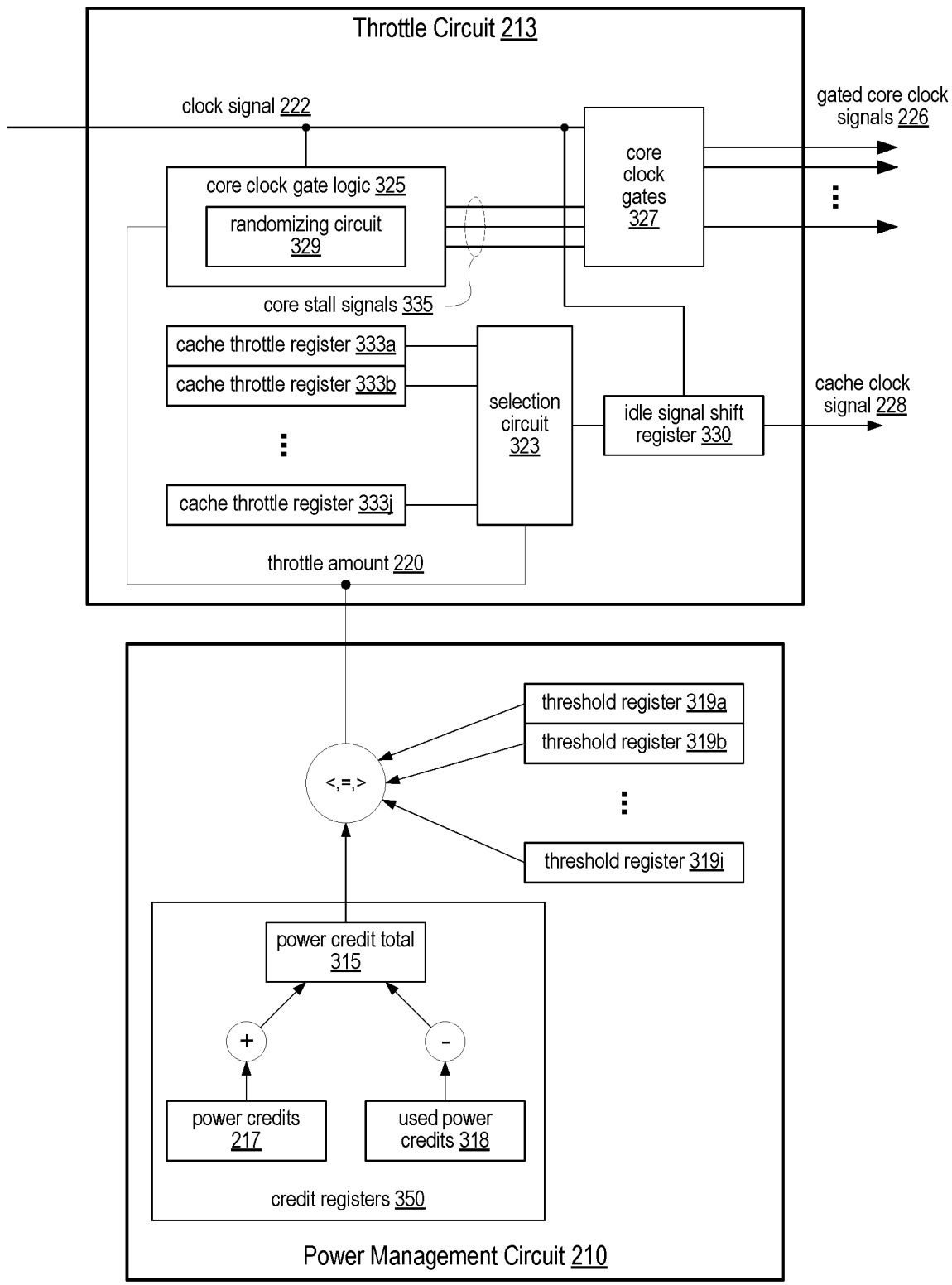
FIG. 3 depicts a block diagram of an embodiment of a power management circuit coupled to a throttle circuit.

Turning to FIG. 3, a block diagram of embodiments of a power management circuit and a throttle circuit are shown. As illustrated, power management circuit 210 includes credit registers 350 for storing an allotment of power credits 217, a value for used power credits 318, and a value for power credit total 315. In addition, power management circuit 210 includes threshold registers 319a-319i (collectively threshold registers 319). Power management circuit 210 is coupled to throttle circuit 213 which includes selection circuit 323, idle signal shift register 330, core clock gate logic 325, and core clock gates 327. Throttle circuit 213 also includes cache throttle registers 333a-333j (collectively cache throttle registers 333). Core clock gate logic 325 includes randomizing circuit 329. Although power management circuit 210 and throttle circuit 213 are illustrated as separate circuits, in some embodiments, throttle circuit 213 may be included as a part of power management circuit 210, for example, as shown in FIG. 1A.

As previously disclosed, power management circuit 210 maintains a power credit model to track power usage by a processor, such as processor circuit 100 or processor 200 in FIGS. 1 and 2, respectively. In order to maintain the power credit model, the power management circuit is configured to receive, at a particular point in time, an allotment of a number of power credits 217, and increase a currently available power credit total 315 by the allotted number of power credits 217. At a different point in time, power management circuit 210 decrements the power credit total 315 based on used power credits 318. In some embodiments, used power credits 318 may be subtracted from power credits 217 and the result added to power credit total 315.

Power credits 217 may be received by power management circuit 210 in a variety of ways. For example, in some embodiments, an allotted number of power credits 217 may be received by power management circuit 210 from another circuit within an IC that includes the processor and power management circuit 210, or from a circuit in a different IC. Power credits 217 may be received at a regular interval, such as every cycle, or every ten cycles, of a clock signal, or may be received at irregular intervals.

In some embodiments, power management circuit 210 may receive one or more values that indicate how many power credits 217 power management circuit 210 is to generate at each interval. For example, power management circuit 210 may receive a table of values from another circuit, or may access a table generated by a software process and stored in a memory accessible by power management circuit 210. Each entry in the table corresponds to a particular power state of the processor, and for each particular power state, the respective entry includes a value indicating a number of power credits to generate. Based on a current power state of the processor, power management circuit 210 determines an allotment number from the table and generates the allotted number of power credits 217 at each interval.

To determine used power credits 318, power management circuit 210 uses energy values that are indicative of power consumption of a plurality of processors and a plurality of banks in the processor. A value of used power credits 318 may be determined within power management circuit 210 or may be received from another circuit that is inside or external to processor 200. Used power credits 318 may be based on estimates and/or measurements of energy usage by the processor. In addition to determining power consumption based on activity of processor cores and cache memory banks that may be subject to throttling actions, used power credits 318 may also be based on energy usage of circuits that are not subjected to throttling actions, such as an additional memory, an additional core, a coprocessor circuit, and the like. Power management circuit 210 may receive or determine a value for used power credits 318 at a particular interval, for example, at every cycle of a clock signal. In other embodiments, used power credits 318 may be determined in response to a particular event, such as a voltage level measurement reaching a particular threshold value or a change in an operating mode of the processor.

Power management circuit 210, as illustrated, compares power credit total 315 to values stored in threshold registers 319. The values in threshold registers 319 may be hard set by a design of power management circuits 210, or may be programmable by software executed by the processor, such as initialization code or boot code. In various embodiments, the comparison may occur every cycle of clock signal 222, whenever the value of power credit total 315 changes, or based on another suitable schedule. If power credit total 315 has not reached any of the values in threshold registers 319, then power management unit asserts throttle amount 220 with a value that indicates that no throttling actions are to be implemented. Otherwise, if a particular one of the values of threshold registers 319 is reached, then power management circuit 210 asserts throttle amount 220 with a respective value that is based on the particular threshold value that has been reached. Each value of throttle amount 220 may indicate a particular number of throttling actions to be enabled by throttle circuit 213, including no actions when no threshold level has been reached.

Throttle circuit 213 is used by power management circuit 210 to enable throttling actions corresponding to a particular threshold value. To insert idle cycles to a cache memory, such as cache memory 205 in FIG. 2, throttle circuit 213 includes cache throttle registers 333 for storing respective patterns for inserting the idle cycles to the cache memory. Throttle circuit 213 selects the particular pattern from a corresponding one of cache throttle registers 333 based on the particular threshold value. As illustrated, each of cache throttle registers 333 includes a same number of data bits, each data bit corresponding to one clock cycle of the cache memory, such as 16 or 32 data bits corresponding to 16 or 32 cache clock cycles. In other embodiments, however, different ones of cache throttle registers 333 may include a different number of data bits. A different idle cycle pattern may be stored into each of cache throttle registers 333 to enable various levels of cache throttling. For example, cache throttle register 333a may hold a pattern in which only one data bit out of sixteen data bits indicates an idle cycle, which may result in a 6.25% decrease in activity in the cache memory. Cache throttle register 333b may hold a pattern in which two data bits out of sixteen data bits indicate idle cycles. The number of idle cycles in each pattern may increase up to cache throttle register 333j which may hold a pattern in which twelve of sixteen data bits indicate idle cycles. Such an idle pattern may result in a 75% reduction in activity in the cache memory.

As illustrated, to select a particular one of cache throttle registers 333, throttle circuit 213 uses selection circuit 323. Selection circuit 323 may correspond to any suitable circuit for selecting a value from one of cache throttle registers 333, for example, a multiplexing circuit. Throttle circuit 213 receives throttle amount 220, the value of which is based on the particular threshold value that has been reached. The value of throttle amount 220 is used by selection logic in selection circuit 323 to select the particular one of cache throttle registers 333. The selected pattern from the selected cache throttle register 333 is loaded into idle signal shift register 330. In response to a transition of the cache clock cycle (e.g., a rising transition on clock signal 222), one data bit from the selected pattern is shifted to an output node of idle signal shift register 330, thereby driving a corresponding value on cache clock signal 228. In various embodiments, either a value of "1" or "0" may indicate an idle cycle. Cache clock signal 228 may be received by the cache memory which may operate normally if an idle cycle is not indicated and otherwise stall a memory request assignment if an idle is indicated. Further details regarding cache memory idling are provided below in regards to FIG. 7.

To stall one or more processor cores (e.g., processor core 101 or 201 in FIGS. 1 and 2, respectively), throttle circuit 213 uses core clock gates 327 to prevent clock signal 222 from reaching one or more cores to be stalled (referred to herein as "clock gating"). As illustrated, core clock gate logic 325 receives throttle amount 220 and may assert one or more core stall signals 335 based on the value of throttle amount 220. Assertion of a particular one of core stall signals 335 results in a corresponding one of core clock gates preventing clock signal 222 from propagating to a respective one of gated core clock signals 226. For example, a particular value of throttle amount 220 may indicate to core clock gate logic to stall one processor core in each successive cycle of clock signal 222. To accomplish this stall pattern, core clock gate logic 325 asserts a different one of core stall signals 335 in response to each transition of clock signal 222.

In some embodiments as disclosed above, an order for stalling the various processor cores may be dithered to avoid generating a harmonic noise pattern on power supply signals. In such embodiments, throttle circuit 213 uses randomizing circuit 329 to determine the particular order for stalling each of the core stall signals 335. As used herein, a "randomizing circuit" is a circuit configured to generate a different pseudo-random value each time the circuit is activated. For example, randomizing circuit 329 may be a linear-feedback shift register (LFSR) used to generate a pseudo-random value based on a particular seed value loaded into the LFSR. The pseudo-random value may then be used to select a particular one of a plurality of processor cores to stall for a next cycle. A new pseudo-random value may be generated each cycle of clock signal 222 and used to select a different one of the processor cores for each subsequent cycle. Core clock gate logic 325 may ensure that each of the plurality of the processor cores is stalled once before stalling any one processor twice. After all cores that are to be stalled have been stalled once during a first iteration, core clock gate logic 325 may load a new seed value into randomizing circuit 329 to generate a different order for stalling the processor cores a second time during a second iteration. Additional details regarding processor core stalling are provided below in regards to FIGS. 4, 5, and 6.

As previously disclosed, certain values of throttle amount 220 may result in some throttling actions being enabled and others not being enabled. For example, a particular value of throttle amount 220 may result in core clock gate logic 325 stalling one or more processor cores, while selection circuit 323 is configured to select a default pattern that does not include an idle cycle for the cache memory. A different value of throttle amount 220 may have an opposite effect, in which no processor cores may be stalled, but one or more idle cycles are sent to the cache memory. Other values of throttle amount 220 may result in a frequency of clock signal 222 being reduced and/or a voltage level of a power signal to the processor being reduced. Some values of throttle amount 220 may result in various combinations of throttling actions being enabled.

It is noted that FIG. 3 is one example of a power management circuit and a throttle circuit. As previously disclosed, throttle circuit 213 may, in some embodiments, be included as a sub-circuit of power management circuit 210. FIGS. 1-3 illustrate various circuits associated with power management in computer systems. FIGS. 4-7 depict possible waveforms that may be associated with these circuits.

Figure 4:
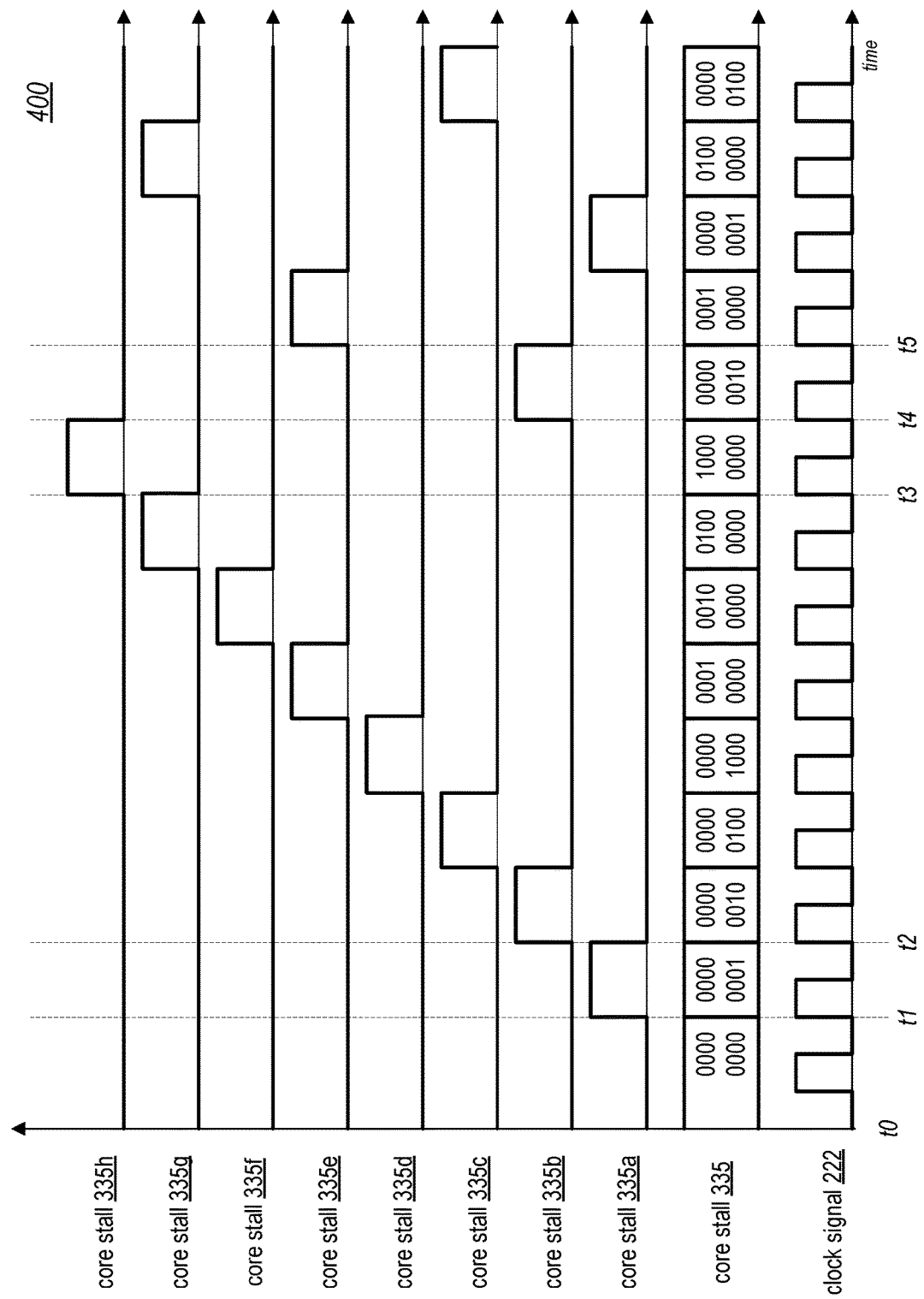
FIG. 4 presents a chart depicting possible waveforms for stalling a processor core by an embodiment of a power management circuit.

Proceeding to FIG. 4, a chart illustrating several waveforms that may be associated with an embodiment of a power management circuit, such as power management circuits 110 or 210, is presented. Chart 400 includes ten waveforms depicting logic states versus time for signals associated with a core stalling operation. Clock signal 222 represents a waveform associated with clock signal 222 shown in FIGS. 2 and 3. Core stall signals 335 is a composite eight-bit value comprising eight individual core stall signals 335a-335h, each used to stall a respective one processor core with in a processor circuit. As illustrated a "1" (or a high logic value) on one of core stall signals 335a-335h causes the respective processor core to be stalled while a "0" (or a logic low value) allows the respective processor core to receive a clock signal based on clock signal 222. Referring collectively to FIGS. 2, 3, and 4, chart 400 starts at time t0.

At time t0, core stall signals 335 are all "0" indicating that no processor core stalling actions are currently active. In various embodiments, power management circuit 210 may not have any throttling actions enabled, or currently enabled throttling actions may not include core stalling. At time t1, core stall signal 335a is asserted. This assertion may be the result of a change in the value of power credit total 315 resulting in reaching a particular threshold value in one of threshold registers 319, for example, threshold register 319a. The value of threshold register 319a, as illustrated, causes power management circuit 210 to enable stalling one processor core 201 per clock cycle as a throttling action. For a first iteration of core stalling, power management circuit 210 determines that cores will be stalled in order from processor core 201a to processor core 201h (not illustrated in FIG. 2). Time t2 occurs one cycle of clock signal 222 after time t1. At time t2, core clock gate logic 325 selects a next one of processor cores 201 to stall for the subsequent clock cycle. Accordingly, core stall signal 335a is de-asserted and core stall signal 335b is asserted. This process repeats through to time t3, at which point a last of processor cores 201, processor core 201h, is selected to be stalled for the next cycle of clock signal 222. At time t4, all processor cores 201 that are to be stalled have been stalled and the first iteration of core stalling has completed.

As illustrated, for a second iteration, core clock gate logic 325 uses randomizing circuit 329 to dither the order for stalling processor cores 201a-201h. A particular seed value may be loaded into randomizing circuit 329, resulting in core stall signal 335b being asserted, at time t4, for the next cycle of clock signal 222. At time t5, a new value from randomizing circuit 329 causes core stall signal 335e to be asserted while the previously asserted core stall signal 335b is de-asserted. This process repeats until each of core stall signals 335a-335d are asserted a second time, at which point the second iteration ends and a third iteration may begin with a new seed value in randomizing circuit 329 to create a new dither pattern.

Figure 5:
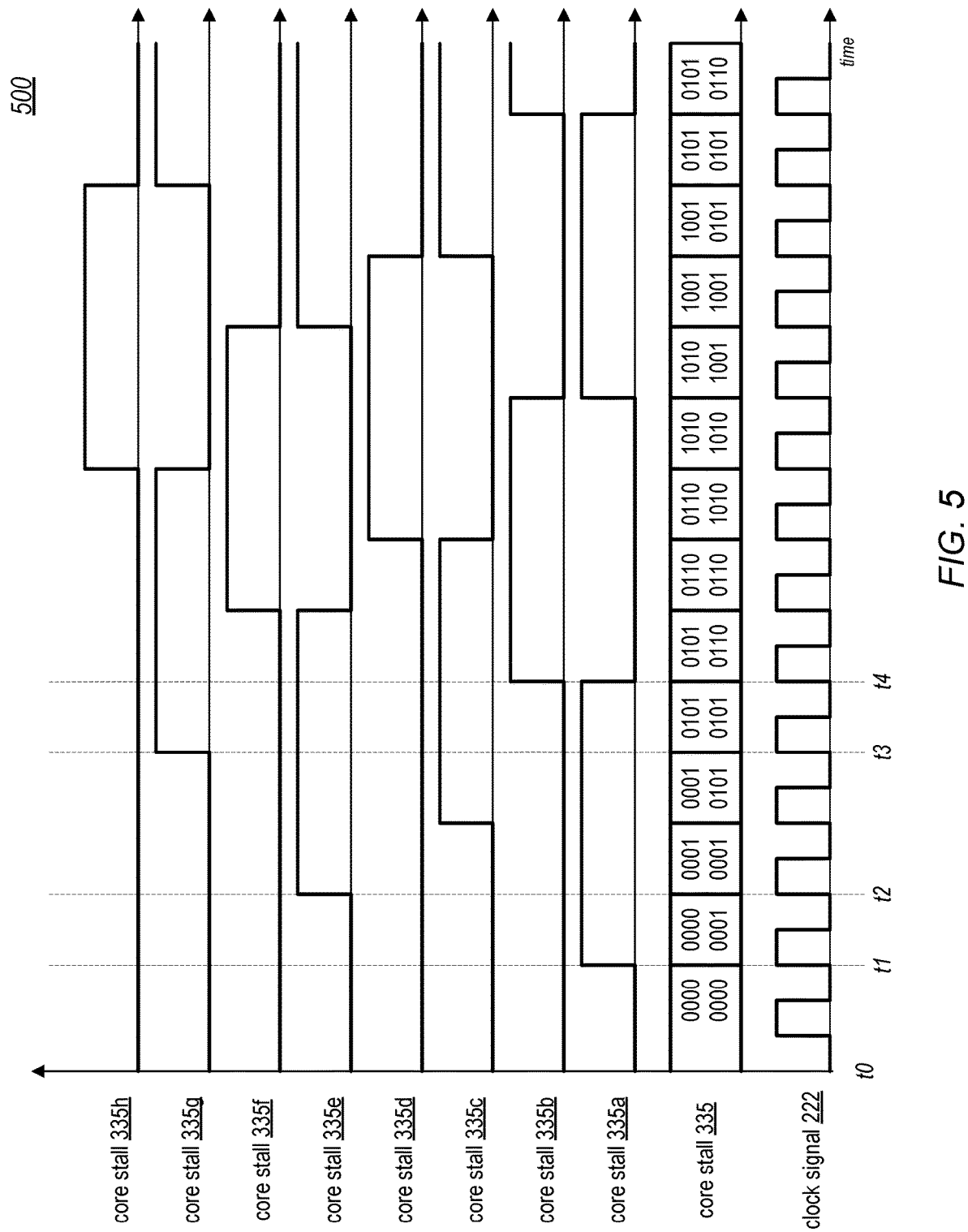
FIG. 5 illustrates a chart showing possible waveforms for stalling multiple processor cores by an embodiment of a power management circuit.

Chart 400 illustrates a case in which a single one of processor cores 201 is stalled for each cycle of clock signal 222. Moving now to FIG. 5, a case is illustrated in which multiple ones of processor cores 201 are stalled in a same cycle of clock signal 222. In the case of chart 500, four processor cores of a plurality of cores (e.g. processor cores 101 or 210 in FIGS. 1 and 2, respectively) are stalled in parallel. Switching from having all cores active to stalling four cores may, in some embodiments, cause a spike in a power supply signal in response to the sudden decrease in current demand. For example, stalling four out of eight total processor cores may result in a 50% reduction in current demand on a power signal to the cores. A 50% reduction of current in a single clock cycle may cause a voltage level of the power signal to rise sharply before a voltage regulator or other power source can adjust its power output to compensate for the reduced current demand. The waveforms of chart 500 illustrate a procedure in which one processor core is stalled in each successive cycle of clock signal 222 until four cores are stalled. Chart 500 of FIG. 5 includes the same waveforms as shown in FIG. 4. Referring collectively to FIGS. 2, 3, and 5, chart 500 starts at time t0.

As illustrated, at time t0, none of core stall signals 335a-335h are asserted, indicating that all cores may be active. Prior to time t1, power management circuit 210 may assert throttle amount 220 with a value that indicates that four core stall signals 335 are to be asserted per cycle of clock signal 222. Instead of asserting four of core stall signals 335 at time t1, core clock gate logic 325 asserts core stall signal 335a only. In the subsequent cycle of clock signal 222 at time t2, core clock gate logic 325 asserts core stall signal 335e while keeping core stall signal 335a asserted, resulting in two processor cores being stalled. This process continues with core stall signal 335c being asserted in a next cycle of clock signal 222 and then core stall signal 335g being asserted at time t3.

Four of core stall signals 335 (335a, 335c, 335e, and 335g) are now asserted at time t3. In the next cycle of clock signal 222 at time t4, core clock gate logic 325 asserts core stall signal 335b. To limit the number of stalled cores to four, core clock gate logic 325 de-asserts core stall signal 335a, the stall signal that has been asserted the longest. The process repeats with core clock gate logic 325 de-asserting the core stall signal 335 that has been asserted the longest in combination with asserting a next core stall signal 335, thereby keeping four of core stall signals 335 asserted in each cycle of clock signal 222 while alternating through the various processor cores 201 to avoid stalling anyone of processor cores 201 for a significantly longer time than the other cores.

Figure 6:
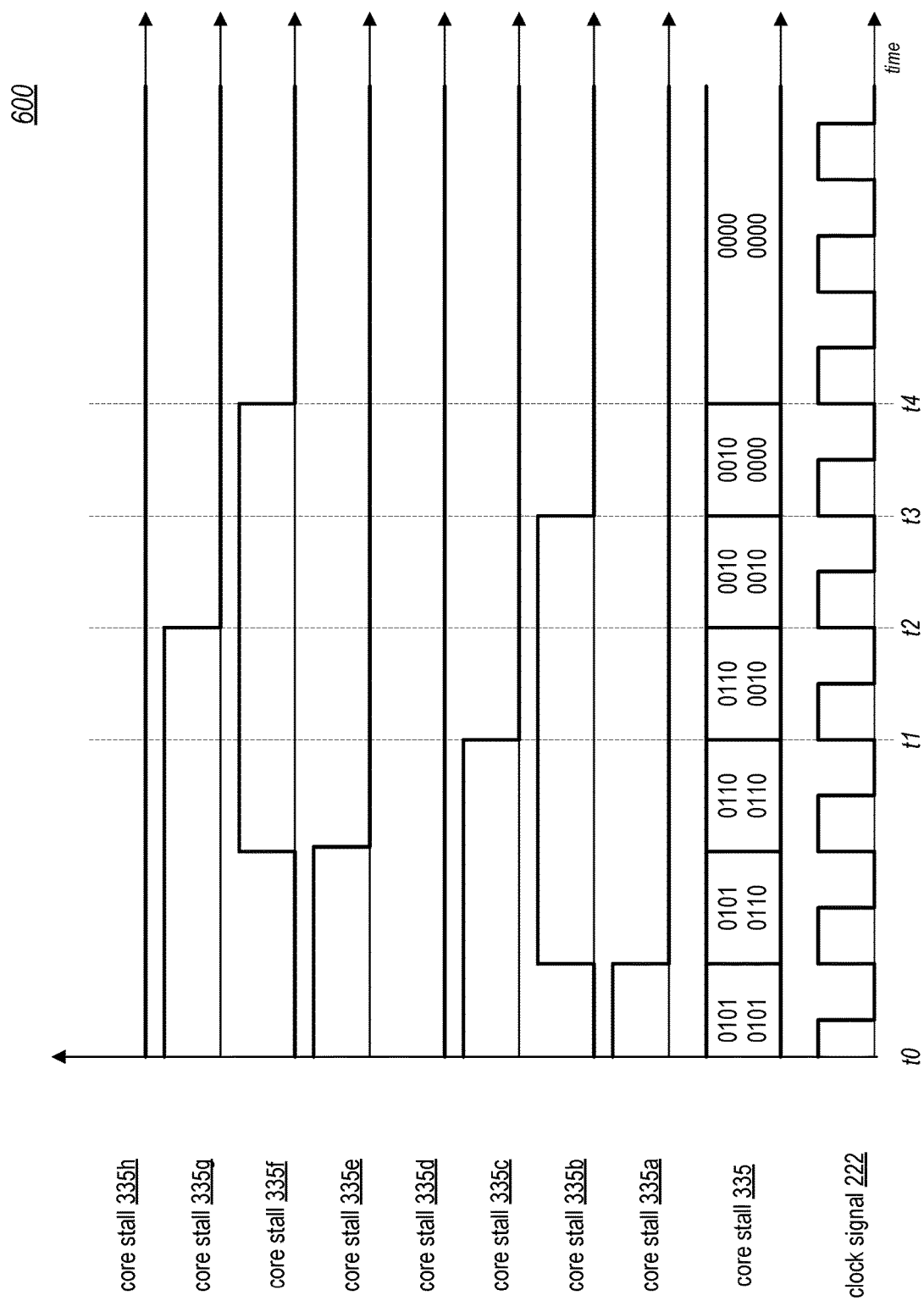
FIG. 6 shows another chart depicting possible waveforms for stalling multiple processor cores by an embodiment of a power management circuit.

Chart 500 illustrates a procedure for initially stalling multiple processor cores for each cycle of a clock signal. Turning now to FIG. 6, chart 600 illustrates a procedure for moving from stalling multiple processor cores to returning to a state with all processor cores being active. Chart 600 of FIG. 6 includes the same waveforms as shown in FIGS. 4 and 5. Referring collectively to FIGS. 2, 3, and 6, chart 600 starts at time t0.

As shown, four of core stall signals 335 are asserted at time t0. From time t0 to time t1, four of core stall signals 335 remain asserted, with core clock gate logic 325 switching which core stall signals 335 are asserted in each cycle of clock signal 222. Prior to time t1, power management circuit 210 asserts a new value on throttle amount 220. This new value results in an end to stalling of the processor cores 201. Core clock gate logic 325, however, does not de-assert all four of the currently asserted core stall signals 335 (335b, 335c, 335f, and 335g. Similar to how stalling four processor cores 201 in a same cycle of clock signal 222, as described above for chart 500, may cause a power spike on a power supply signal due to the sudden decrease in current consumption, reactivating four of processor cores 201 in a same cycle of clock signal 222 may cause a power droop on the power supply signal due to the sudden increase in current consumption. For example, reactivating four out of eight total processor cores may result in a 100% increase in current demand on the power signal. This doubling of current consumption in a single clock cycle may cause a voltage level of the power signal to fall sharply before a voltage regulator or other power source can adjust its power output to compensate for the increased current demand.

To decrease a possibility of causing a power droop on the power supply signal, core clock gate logic 325 de-asserts a single one of core stall signals 335 at time t1. As illustrated, core clock gate logic 325 de-asserts the core stall signal 335 that has been active the longest, in this example, core stall signal 335c. In each successive cycle of clock signal 222, core clock gate logic 325 de-asserts another one of core stall signals 335. Core stall signal 335g is de-asserted at time t2, core stall signal 335b at time t3, and core stall signal 335f at time t4. After time t4, all core stall signals 335 are de-asserted and the corresponding processor cores 201 may all be active.

It is noted that FIGS. 4-6 depict charts that illustrate possible waveforms associated with stalling processor cores. Proceeding to FIG. 7, two charts are depicted that show possible waveforms for idling a cache memory. The waveforms of charts 700 and 710 may represent waveforms corresponding to signals generated by power management circuits 110 and 210 as well as throttle circuits 113 and 213 as shown in FIGS. 1-3. The embodiments in FIGS. 2 and 3 will be referred to for the illustrated example. Charts 700 and 710 each include waveforms depicting four signals. Clock signal 222 represents a waveform associated with clock signal 222, and cache clock signal 228 depicts a waveform associated with cache clock signal 228, each shown in FIGS. 2 and 3. Cache idle pattern 730 corresponds to a selected idle pattern that may be stored in one of cache throttle registers 333. Cache transactions 740 represents a plurality of memory requests that are sent to cache memory 205 from processor cores 201. Cache transactions 740 have been prioritized in arbitration circuit 209, and are in queue to be assigned and fulfilled in one of banks 207.

Chart 700 illustrates an example of a cache memory idle pattern that is sixteen clock cycles long with two cache idle cycles inserted. The sixteen cycles of the selected idle pattern 730 begin just after time t0. The illustrated idle pattern 730 of "1111_1110_1111_1110" indicates that cache memory 205 performs normally for seven cycles of cache clock signal 228 (indicated by '1') and then idles for one clock cycle (indicated by '0'). As illustrated, performing normally includes assigning the highest priority one of cache transactions 740. For example, during the first cycle of cache clock signal 228, cache transaction T1 is assigned, followed, in order, by transactions T2-T7, until time t1. It is noted that in the illustrated embodiment, cache clock signal 228 is generated from clock signal 222 with a same frequency. In other embodiments, however, a frequency of cache clock signal 228 may be divided down from clock signal 222. In some embodiments, cache clock signal 228 may be generated from a different clock signal.

At time t1, a first idle cycle is inserted into cache clock signal 228, causing cache memory 205 to stall the assignment of cache transaction T8. At time t2, the idle cycle has ended and cache transaction T8 is assigned in the following cycle of cache clock signal 228. In other embodiments, cache transaction T8 may be moved to a retry queue in response to the idle cycle and transaction T9 assigned at time t2 instead.

From time t2 to time t3, cache memory 205 performs normally for another seven cycles of cache clock signal 228 until a second idle cycle is inserted at time t3. At time t4 a first iteration of the selected idle pattern 730 has completed with the second idle cycle. As illustrated, cache transaction T15 is assigned in a first cycle of a following iteration of the idle pattern 730. In some embodiments, the idle cycles may be dithered in the second, and subsequent, iterations to avoid generating a repeating pattern of when cache memory 205 reduces power due to the idle cycles. In other embodiments, however, the selected idle pattern 730 may repeat as it is stored in the respective one of cache throttle registers 333.

Chart 710 illustrates a similar idle pattern that is sixteen clock cycles long. In chart 710, however, a different idle pattern 730 is selected that includes four idle cycles rather than the two idle cycles shown in chart 700. The illustrated idle pattern 730 of chart 710 is "1110_1110_1110_1110," indicating that cache memory 205 performs normally for three cycles of cache clock signal 228 and then idles for one clock cycle, and repeats this pattern four times. As shown, the idle cycles are inserted at times t1, t2, t3, and t4.

It is noted that in chart 700, fourteen cache transactions (T1-T14) are assigned during the sixteen cycles of the selected idle pattern 730. In chart 710, only twelve cache transactions (T1-T12) are assigned during the sixteen cycles. In some embodiments, by doubling the number of idle cycles, an amount of power saved by the extra idle cycles may also be doubled. In other embodiments, however, current leakage in cache memory 205 and/or other types of current draw may result in an additional power savings that is less than double.

Figure 7:
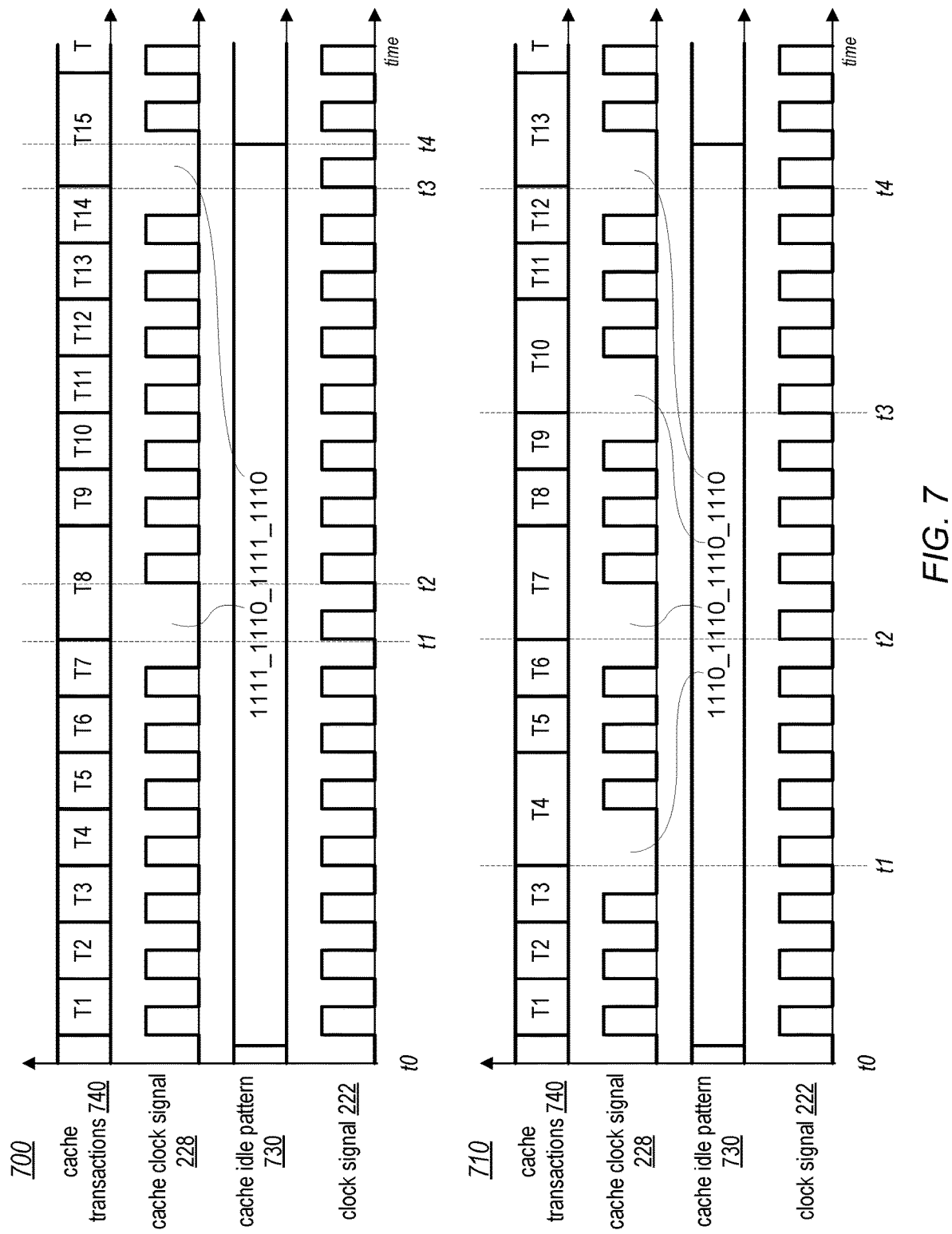
FIG. 7 depicts a chart illustrating possible waveforms for idling a cache memory by an embodiment of a power management circuit.

It is further noted that in the charts of FIG. 7, idle cycles are implemented by retaining cache clock signal 228 in a low state when the idle is inserted. It is contemplated that other procedures for inserting an idle cycle may be implemented in other embodiments. For example, in some embodiments, cache clock signal 228 may be held in a high state rather than a low state. In other embodiments, cache clock signal 228 may be replaced with an enable signal rather than a clock signal, e.g., in which the enable signal is asserted to a high state to enable normal operation of cache memory 205 and de-asserted to a low state to insert an idle signal.

The charts in FIGS. 4-7 all show actions occurring in response to rising transitions of clock signal 222. In other embodiments, however, actions may be in response to falling transitions or to both rising and falling transitions of clock signal 222. In addition, the waveforms of the illustrated charts in these figures are simplified for clarity. It is noted that, in some embodiments, these waveforms appear different due to effects of circuit design, such as rise and fall times of transistors and/or due to noise coupled from other circuits in processor 200.

Figure 8:
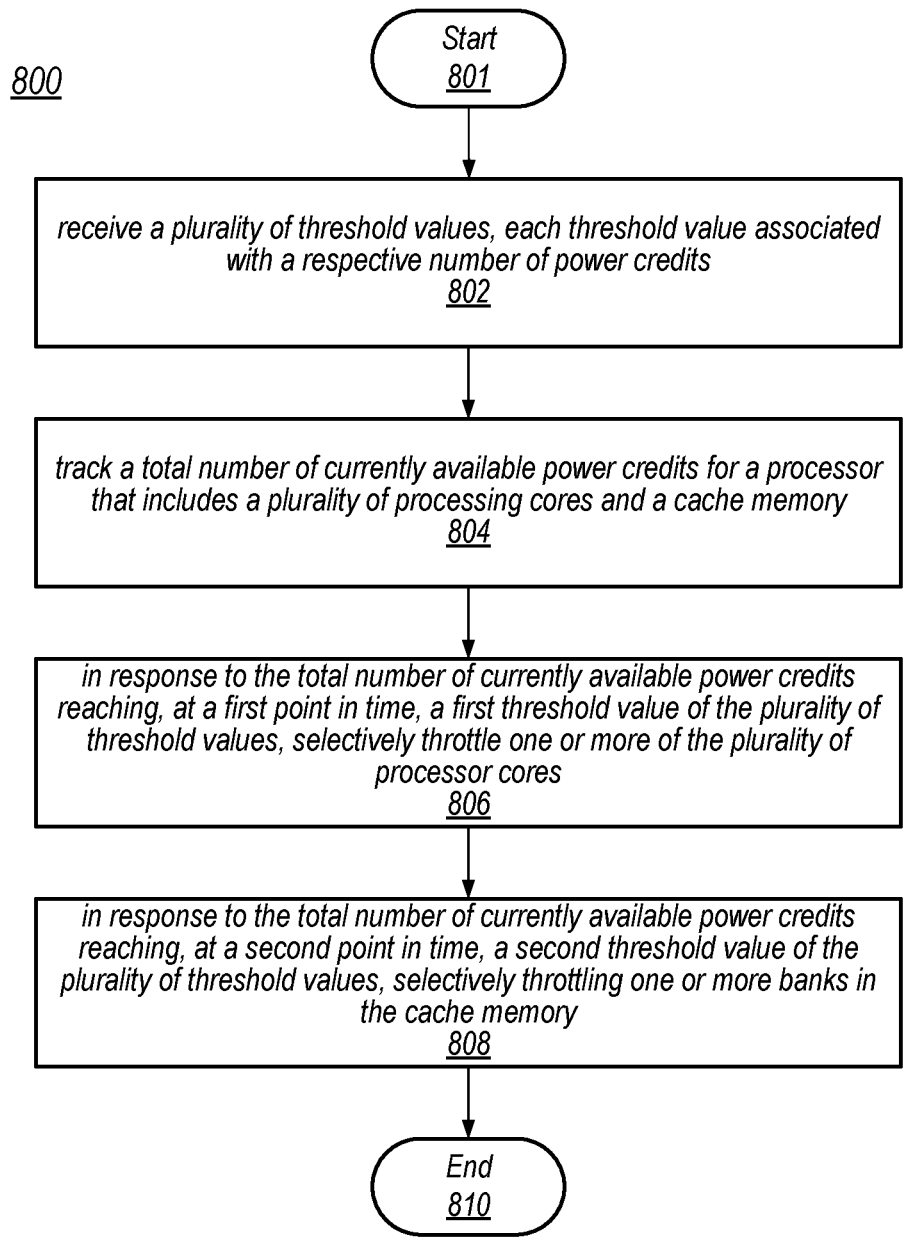
FIG. 8 illustrates a flow diagram of an embodiment of a method for throttling a processor based on a number of power credits.

Moving to FIG. 8, a flow diagram illustrating an embodiment of a method for operating a power management circuit is shown. Method 800 may be applied to any of the previously disclosed power management circuits, such as power management circuit 110 or 210 in FIGS. 1-3. Referring collectively to processor circuit 100 in FIG. 1A and the flow diagram in FIG. 8, method 800 begins in block 801.

A power management circuit receives a plurality of threshold values, each threshold value associated with a respective number of power credits (block 802). As illustrated, power management circuit 110 stores threshold values 119*a*-119*i*. Each of threshold values 119 corresponds to a different value of power credit total 115. Power management circuit 110 compares power credit total 115 to at least one of threshold values 119. This comparison may occur based on an elapsed time since a previous comparison or may occur in response to a change in value of power credit total 115. For example, power management circuit 110 may decrement power credit total 115 based on a determined power usage by processor circuit 100 and, in response to the change, compare the value of power credit total 115 to a highest one of threshold values 119. If power credit total 115 is greater than the highest threshold value 119, then the comparison ends. Otherwise, power credit total 115 is iteratively compared to a next highest threshold value 119 until power management circuit 110 determines the lowest threshold value 119 that power credit total 115 has reached.

A power management circuit tracks a total number of currently available power credits for a processor that includes a plurality of processing cores and a cache memory (block 804). Power management circuit 110 tracks power credit total 115 for processor circuit 100 by incrementing and decrementing power credits over time. Power credits may be allotted to processor circuit 100 at particular intervals such as an amount of time or a number of clock cycles. In other embodiments, power credits may be allotted in response to particular occurrences such as an overall power usage of a computer system that includes processor circuit 100 reaching a particular threshold. Power management circuit 110 increments power credit total 115 after receiving an allotment and may decrement power credit total 115 based on power usage by processor circuit 100. In various embodiments, power usage by processor circuit 100 may be determined bases on current or voltage measurements, by estimates based on an operating mode of processor circuit 100, or by a combination of measurements and estimates.

In response to the total number of currently available power credits reaching, at a first point in time, a first threshold value of the plurality of threshold values, the power management circuit selectively throttles one or more of the plurality of processor cores (block 806). Power management circuit 110, for example, may determine that power credit total 115 has reached threshold value 119*b* at the first point in time. Reaching threshold value 119*b* causes throttle circuit 113 to enable at least one throttling action. In this example, the throttling actions include stalling one or more of processor cores 101 in a manner, for example, as described above in regards to FIG. 4.

In response to the total number of currently available power credits reaching, at a second point in time, a second threshold value of the plurality of threshold values, the power management circuit selectively throttles one or more banks in the cache memory (block 808). At the second point in time, power management circuit 110 may determine that power credit total 115 has reached a different one of threshold values 119, such as threshold value 119*a*. Under various conditions, threshold value 119*a* may be greater than or less than the previously reached threshold value 119*b*. For example, stalling the one or more processor cores 101 may reduce power consumption by processor circuit 100, causing power credit total 115 to rise and reach a higher one of threshold values 119. Conversely, the throttling actions enabled based on threshold value 119*b* may not be adequate to compensate for power usage by processor circuit 100, causing power credit total to decrease and reach a lower one of threshold values 119.

In either case, the throttling actions enabled based on threshold value 119*a* include enabling one or more idle cycles in cache memory 205. These idle cycles may result in one or more of banks 107 to be throttled by stalling assignment of memory requests to the one or more banks, such as described above in regards to FIG. 7. The method ends in block 810. In some embodiments, method 800 may be repeated until a termination point (e.g., power management circuit 110 is disabled or powered down) is reached. In other embodiments, a portion of method 800 may be repeated, such as blocks 804, 806, and 808.

It is noted that method 800 is one example related to operation of a power management circuit. Method 800 describes one process for operating a power management circuit, including throttling processor cores and banks of a cache memory. Methods for such throttling actions may include multiple operations. Two such methods are described below.

Figure 9:
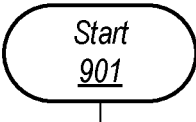
FIG. 9 shows a flow diagram of an embodiment of a method for throttling a plurality of processor cores.
Figure 9:
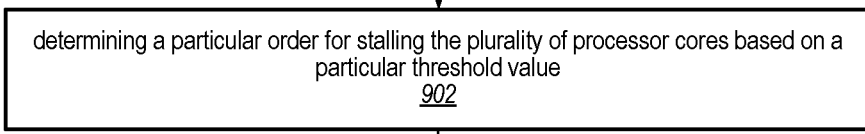
Figure 9:
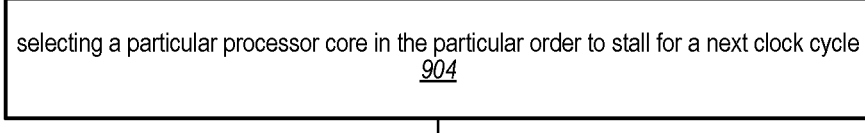
Figure 9:
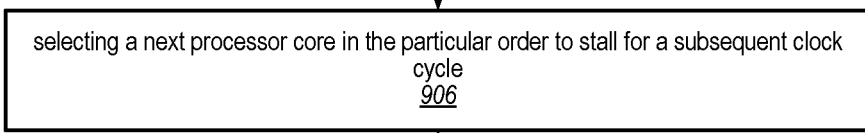
Figure 9:
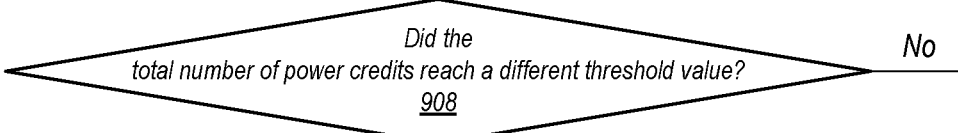
Figure 9:
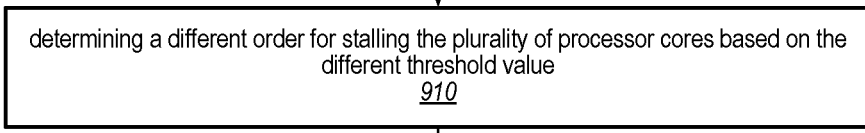
Figure 9:
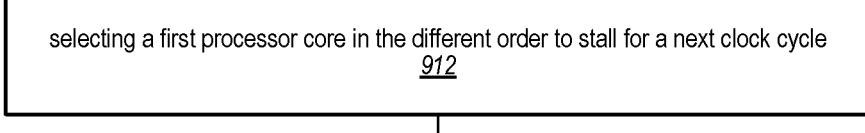
Figure 9:
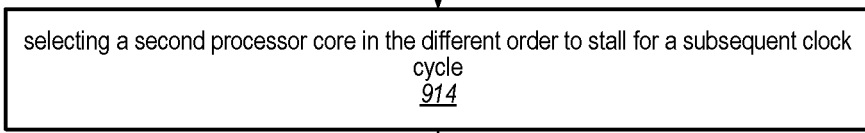
Figure 9:
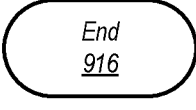

Turning to FIG. 9, a flow diagram for a method for stalling one or more processor cores by a power management circuit is illustrated. In some embodiments, method 900 may correspond to operations performed in block 806 of method 800 in FIG. 8. Accordingly, method 900 may be applied to any of the previously disclosed power management circuits, such as power management circuit 110 or 210 in FIGS. 1-3. Referring collectively to FIGS. 2, 3 and 9, method 900 begins in block 901.

A power management circuit determines a particular order for stalling the plurality of processor cores based on a particular threshold value (block 902). As illustrated, power management circuit 210 uses throttle circuit 213 to determine the particular order for stalling processor cores 201. A number of processor cores to be stalled in each cycle of clock signal 222 is also determined based on the particular threshold level. In the illustrated case, one processor core is stalled per cycle. Under some conditions, a subset of processor cores 201 may be stalled. For example, if only four out of eight processor cores 201 are active, then only the four active cores may be included in the determined order. In some embodiments, the particular order may start with processor core 201*a* and finish with processor core 201*n*. In other embodiments, core clock gate logic 325 may use randomizing circuit 329 to create a pseudo-random order for stalling processor core 201 to avoid generating harmonic noise on a power supply line.

The power management circuit selects, according to the particular order, a particular processor core to stall for a next clock cycle (block 904). After the particular order for stalling processor cores 201 has been determined, a first one of processor cores 201 is selected. Core clock gate logic 325 disables a corresponding one of core clock gates 327, thereby preventing transitions on a respective one of gated core clock signals 226. As shown, the corresponding core clock gate 327 is disabled for one cycle of clock signal 222 before moving to block 906 to select a next one of processor cores 201. In other embodiments however, the corresponding core clock gate may be disabled for multiple cycles of clock signal 222 before moving to block 906.

The power management circuit selects, according to the particular order, a next processor core to stall for a subsequent clock cycle (block 906). As illustrated, core clock gate logic 325 selects the next one of processor cores 201 in the determined order. Again, the corresponding one of core clock gates 327 is disabled, thereby blocking propagation of transitions on the respective gated core clock signal 226. In addition, the previously disabled core clock gate 327 is enabled, allowing transitions to propagate to the previously stalled one of processor cores 201.

Further operations of method 900 may depend on a total number of currently available power credits (block 908). If a value of power credit total 315 changes, for example, due to a new allotment of power credits being received or due to spending the available power credits, then the new value of power credit total 315 may be compared to one or more values in threshold registers 319. If power credit total 315 reaches a different threshold value, then power management circuit 210 updates a value of throttle amount 220 accordingly. If a different threshold value is reached, then the method moves to block 910 to determine a new order for stalling processor cores 201. Otherwise, the method returns to block 906 to select a next processor core in the current order.

The power management circuit determines a different order for stalling the plurality of processor cores based on the different threshold value (block 910). As shown, the new value of throttle amount 220 results in a different order for stalling processor cores 201. The different order includes selecting a different number of processor cores 201 to stall in each cycle of clock signal 222. As in block 902, randomizing circuit 329 may be used to generate a pseudo-random order for stalling the cores.

The power management circuit selects, according to the different order, a first processor core to stall for a next clock cycle (block 912). A first core in the different order is selected and core clock gate logic 325 disables the corresponding one of core clock gates 327. Accordingly, transitions on the respective one of gated core clock signals 226 are blocked and the selected processor core 201 is stalled.

The power management circuit selects, according to the different order, a second processor core to stall, in addition to the first processor core, for a subsequent clock cycle (block 914). Similar to block 912, a second core in the different order is selected, and core clock gate logic 325 disables the corresponding one of the core clock gates 327. In this different order, however, the core clock gate 327 corresponding to the first stalled core is not enabled. Both the first and second selected processor cores 201 remain stalled in the current cycle of clock signal 222. If additional cores are to be stalled in a same clock cycle in the different order, then operations of block 914 may repeat for additional processor cores 201 until the appropriate number of cores are stalled. Once the appropriate number of cores are stalled, a previously selected processor core 201 may be enabled for each additional processor core 201 that is stalled. Method 900 ends in block 916. In a similar manner as described for method 800, method 900, or a portion thereof, may be repeated until a termination point is reached.

Figure 10:
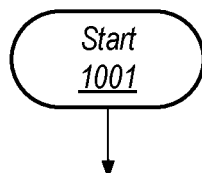
FIG. 10 presents a flow diagram of an embodiment of a method for throttling a cache memory.
Figure 10:
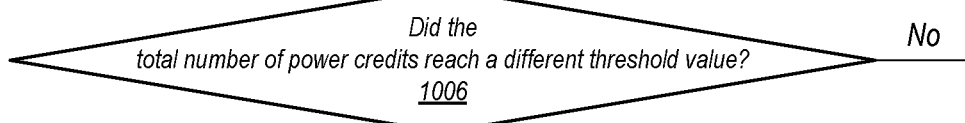
Figure 10:
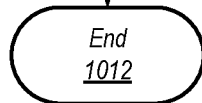

Method 900 describes operation for stalling one or more processing cores. A method for idling a cache memory is now disclosed. Proceeding to FIG. 10, a flow diagram for a method for inserting idle cycles into a cache memory is depicted. Method 1000, in some embodiments, may correspond to operations included in block 808 of method 800 in FIG. 8. Accordingly, method 1000 may be applied to any of the power management circuits disclosed herein, such as power management circuit 110 or 210 in FIGS. 1-3. Referring collectively to FIGS. 2, 3 and 10, method 1000 begins in block 1001.

A power management circuit determines a particular pattern for inserting idle cycles for the cache memory (block 1002). Power management circuit 210 sets a value of throttle amount 220 based on a particular threshold value reached in threshold registers 319. Based on this value of throttle amount 220, selection circuit 323 selects a corresponding one of cache throttle registers 333. The selected cache throttle register 333 stores the particular pattern for inserting idle cycles for cache memory 205. The particular pattern is loaded into idle signal shift register 330, and based on the particular pattern, an indication for either a normal cycle or an idle cycle is sent to cache memory 205.

The cache memory stalls an assignment of a memory request to a respective memory bank in response to detecting an insertion of an idle cycle by the power management circuit (block 1004). If cache memory 205 receives an indication for a normal cycle, then arbitration circuit 209 assigns a prioritized memory request to a particular one of banks 207. Otherwise, if cache memory 205 receives an indication for an idle cycle, then arbitration circuit 209 stalls the assignment of the prioritized memory request during the idled cycle. In various embodiments, the stalled memory request may be assigned during a next normal cycle or may be sent to a memory request retry queue. As shown, this process repeats until the particular pattern loaded into idle signal shift register 330 has completed. Once complete, the particular pattern may begin a second iteration without any changes to the pattern. In other embodiments, the particular pattern may be dithered to rearrange the timing of the idle cycle indications.

Further operations of the method may depend on a number of currently available power credits at a different point in time (block 1006). If power credit total 315 reaches a threshold value in a different one of threshold registers 319, power management circuit 210, in the illustrated embodiment, sets a new value for throttle amount 220 and moves to block 1008 to determine a new pattern for inserting idle cycles. Otherwise, the method returns to block 1004 to continue inserting idle cycles based on the current pattern.

The power management circuit determines a different pattern for inserting idle cycles for the cache memory (block 1008). Based on the new value of throttle amount 220, selection circuit 323 selects a different one of cache throttle registers 333 which stores a different pattern. As illustrated, this different pattern includes a different number of idle cycles than the particular pattern selected in block 1002. The different pattern is loaded into idle signal shift register 330 and an indication for a first cycle of the different pattern is sent to cache memory 205.

The cache memory stalls an assignment of a memory request to a respective memory bank in response to detecting an insertion of an idle cycle by the power management circuit (block 1010). As previously described, arbitration circuit 209 either assigns or stalls an assignment of a prioritized memory request based on the current indication received from idle signal shift register 330. The method ends in block 1012. As described for methods 800 and 900, method 1000, or a portion thereof, may be repeated until a termination point is reached.

Figure 11:
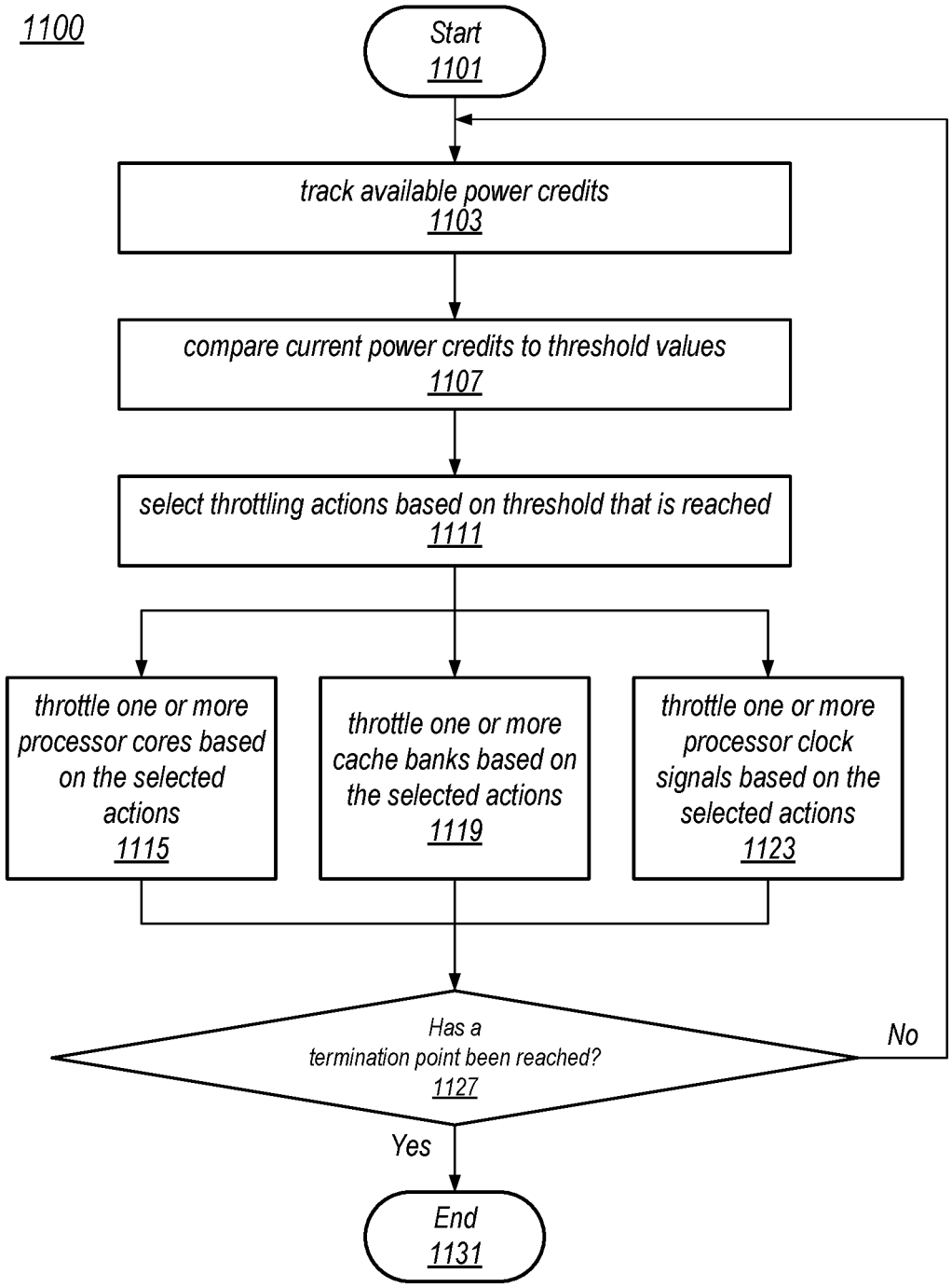
FIG. 11 shows a flow diagram of an embodiment of a method for selecting throttling actions by a power management circuit.

FIGS. 8-10 disclose various methods for operating a power management circuit to manage power usage by a processor circuit. The described methods may correspond to respective subsets of operations performed by a power management circuit. Moving now to FIG. 11, a flow diagram illustrating an embodiment of another method for operating a power management circuit, such as power management circuit 110, is illustrated. In some embodiments, method 1100 may include some or all of the operations described above for methods 800, 900, and 1000. Referring to FIG. 1A and the flow diagram of FIG. 11, method 1100 begins in block 1101 with power management circuit 110 being enabled, for example, after a power-on event or an end of a system reset.

A power management circuit tracks available power credits (block 1103). Power management circuit 110 tracks power credit total 115 which is a current count of power credits available for use by processor circuit 100. In some embodiments, power management circuit 110 receives an allotment of power credits, for example, from a power management unit external to processor circuit 100, at particular intervals. In a similar manner, power management circuit may receive an indication of how many power credits processor circuit 100 used during a similar interval. Power management circuit 110 adds the allotted power credits to, and deducts the used power credits from, power credit total 115.

The power management circuit compares a number of currently available power credits to a plurality of threshold values (block 1107). As illustrated, power management circuit 110 compares power credit total 115 to threshold values 119. An indication of which threshold value has been reached is sent to throttle circuit 113.

The power management circuit selects throttling actions based on the threshold value that is reached (block 1111). Throttle circuit 113 may select one or more throttling actions to implement based on the particular one of threshold values 119 has been reached by power credit total 115. In some cases, no throttling actions may be selected, allowing processor circuit 100 to operate without power restrictions. As illustrated, throttle circuit 113 may select from three throttling actions. In other embodiments, a different number of throttling actions may be available.

A first available throttling action is to throttle one or more processor cores based on the selected actions (block 1115). Throttle circuit 113, as previously described, may select a number of processor cores 101 to stall for each cycle of a core clock signal. The selected number of processor cores 101 may be stalled for each cycle, with at least one stalled core being enabled on a subsequent cycle while a different core is stalled instead. A process for stalling the cores may correspond to the descriptions disclosed above in regards to FIGS. 4-6.

A second available throttling action is to throttle one or more cache banks based on the selected actions (block 1119). In a similar manner as described above in regards to FIG. 7, throttle circuit 113 may select a particular cache idle pattern for inserting a number of idle cycles to cache memory 105. In response to receiving an idle cycle, cache memory 105 stalls an assignment of a memory transaction to a respective one of banks 107.

A third available throttling action is to throttle one or more processor clock signals based on the selected actions (block 1123). As shown, throttle circuit 113 may reduce a frequency of one or more clock signals that are received by processor cores 101. In some embodiments, the frequency may be reduced by altering a period of each clock cycle. In other embodiments, the period of each clock signal may remain the same, but one or more clock pulses are blocked (e.g., gated) from reaching processor cores 101.

The selected throttling actions of blocks 1115, 1119, and 1123 may repeat while power management circuit 110 continues to perform the operations of blocks 1103, 1107, and 1111. Repetition of method 1100 may depend on receiving an indication that a termination point has been reached (block 1127). The termination point may include, for example, a power-down event or receiving an indication to disable power management circuit 110. If a termination point is reached, then the method ends in block 1131. Otherwise, the method returns to block 1103 to continue to track available power credits.

It is noted that method 1100 is one example for operating a power management circuit using the disclosed concepts. Although processor circuit 100 and power management circuit 110 are used in the example, in other embodiments, method 1100 may be applied to processor 200 and power management circuit 210. Some operations may be performed in parallel or in a different order. For example, block 1127 is shown at the bottom of the flow diagram. A termination point, however, may be reached concurrently with any of the other illustrated operations.

Figure 12:
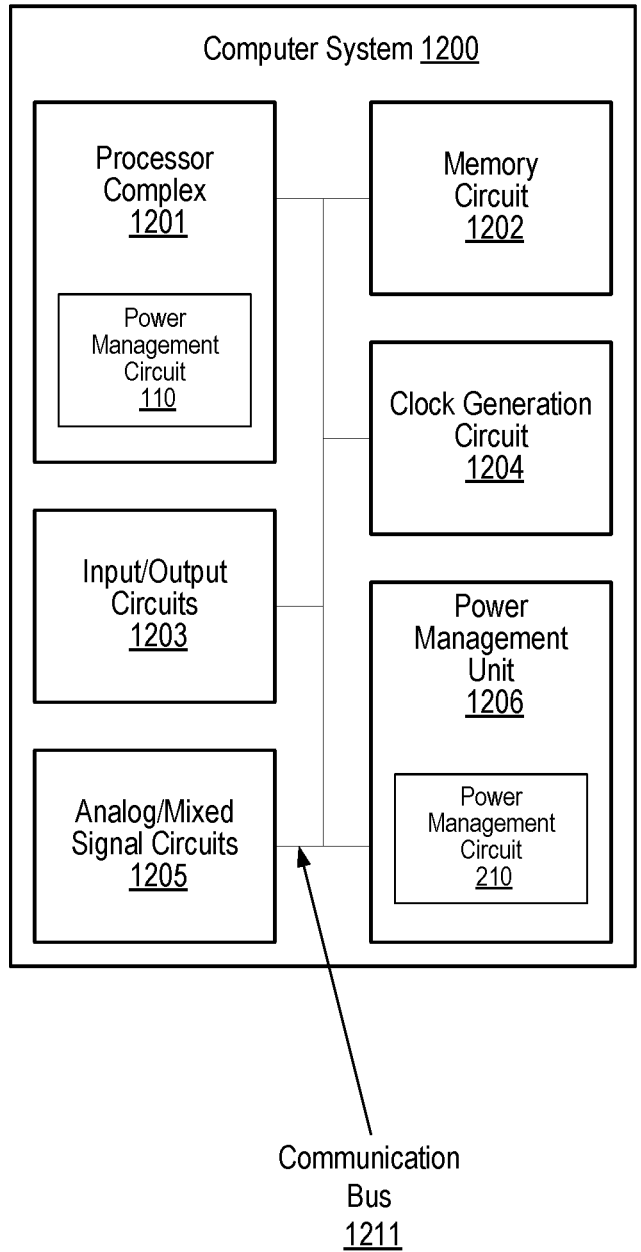
FIG. 12 depicts a block diagram of an embodiment of a system-on-chip (SoC).

Power management circuits and processor circuits, such as those described above, may be used in a variety of computer systems, such as a desktop computer, laptop computer, smartphone, tablet, wearable device, and the like. In some embodiments, the circuits described above may be implemented on a system-on-chip (SoC) or other type of integrated circuit (IC). A block diagram illustrating an embodiment of computer system 1200 that includes the disclosed circuits is illustrated in FIG. 12. In some embodiments, computer system 1200 may provide an example of an IC that includes processor circuit 100 and/or processor 200 in FIGS. 1 and 2, respectively. As shown, computer system 1200 includes processor complex 1201, memory circuit 1202, input/output circuits 1203, clock generation circuit 1204, analog/mixed-signal circuits 1205, and power management unit 1206. These functional circuits are coupled to each other by communication bus 1211.

In some embodiments, processor complex 1201 may, correspond to or include processor circuit 100 and/or processor 200. Processor complex 1201, in various embodiments, may be representative of a general-purpose processor that performs computational operations. For example, processor complex 1201 may be a central processing unit (CPU) such as a microprocessor, a microcontroller, an application-specific integrated circuit (ASIC), or a field-programmable gate array (FPGA). In some embodiments, processor complex 1201 may correspond to a special purpose processing core, such as a graphics processor, audio processor, or neural processor, while in other embodiments, processor complex 1201 may correspond to a general-purpose processor configured and/or programmed to perform one such function. Processor complex 1201, in some embodiments, may include a plurality of general and/or special purpose processor cores as well as supporting circuits for managing, e.g., power signals, clock signals, and memory requests. In addition, processor complex 1201 may include one or more levels of cache memory to fulfill memory requests issued by included processor cores. In some embodiments, processor complex 1201 may include power management circuits such as power management circuits 110 and 210 in FIGS. 1 and 2, and throttle circuit 213 in FIG. 2.

Memory circuit 1202, in the illustrated embodiment, includes one or more memory circuits for storing instructions and data to be utilized within computer system 1200 by processor complex 1201. In various embodiments, memory circuit 1202 may include any suitable type of memory such as a dynamic random-access memory (DRAM), a static random-access memory (SRAM), a read-only memory (ROM), electrically erasable programmable read-only memory (EEPROM), or a non-volatile memory, for example. It is noted that in the embodiment of computer system 1200, a single memory circuit is depicted. In other embodiments, any suitable number of memory circuits may be employed.

Input/output circuits 1203 may be configured to coordinate data transfer between computer system 1200 and one or more peripheral devices. Such peripheral devices may include, without limitation, storage devices (e.g., magnetic or optical media-based storage devices including hard drives, tape drives, CD drives, DVD drives, etc.), audio processing subsystems, or any other suitable type of peripheral devices. In some embodiments, input/output circuits 1203 may be configured to implement a version of Universal Serial Bus (USB) protocol or IEEE 1394 (Firewire®) protocol.

Input/output circuits 1203 may also be configured to coordinate data transfer between computer system 1200 and one or more devices (e.g., other computing systems or integrated circuits) coupled to computer system 1200 via a network. In one embodiment, input/output circuits 1203 may be configured to perform the data processing necessary to implement an Ethernet (IEEE 802.3) networking standard such as Gigabit Ethernet or 10-Gigabit Ethernet, for example, although it is contemplated that any suitable networking standard may be implemented. In some embodiments, input/output circuits 1203 may be configured to implement multiple discrete network interface ports.

Clock generation circuit 1204 may be configured to enable, configure and manage outputs of one or more clock sources. In various embodiments, the clock sources may be located in analog/mixed-signal circuits 1205, within clock generation circuit 1204, in other blocks with computer system 1200, or come from a source external to computer system 1200, coupled through one or more I/O pins. In some embodiments, clock generation circuit 1204 may be capable of enabling and disabling (e.g., gating) a selected clock source before it is distributed throughout computer system 1200. Clock generation circuit 1204 may include registers for selecting an output frequency of a phase-locked loop (PLL), delay-locked loop (DLL), frequency-locked loop (FLL), or other type of circuits capable of adjusting a frequency, duty cycle, or other properties of a clock or timing signal. In some embodiments, clock signal 222, as shown in FIGS. 2 and 3, may be generated by clock generation circuit 1204.

Analog/mixed-signal circuits 1205 may include a variety of circuits including, for example, a crystal oscillator, PLL or FLL, and a digital-to-analog converter (DAC) (all not shown) configured to generated signals used by computer system 1200. In some embodiments, analog/mixed-signal circuits 1205 may also include radio frequency (RF) circuits that may be configured for operation with cellular telephone networks. Analog/mixed-signal circuits 1205 may include one or more circuits capable of generating a reference voltage at a particular voltage level, such as a voltage regulator or band-gap voltage reference.

Power management unit 1206 may be configured to generate a regulated voltage level on a power supply signal for processor complex 1201, input/output circuits 1203, memory circuit 1202, and other circuits in computer system 1200. In various embodiments, power management unit 1206 may include one or more voltage regulator circuits, such as, e.g., a buck regulator circuit, configured to generate the regulated voltage level based on an external power supply (not shown). In some embodiments any suitable number of regulated voltage levels may be generated. Additionally, power management unit 1206 may include various circuits for managing distribution of one or more power signals to the various circuits in computer system 1200, including maintaining and adjusting voltage levels of these power signals. Power management unit 1206 may include circuits for monitoring power usage by computer system 1200, including determining or estimating power usage by particular circuits. For example, power management unit 1206 may determine power usage by each of a plurality of processor circuits in processor complex 1201. Based on the determined power usage, power management unit 1206 may allocate a respective number of power credits to some or all of the particular circuits. Power management circuit 210 may, in some embodiments, be included in power management unit 1206.

It is noted that the embodiment illustrated in FIG. 12 includes one example of a computer system. A limited number of circuit blocks are illustrated for simplicity. In other embodiments, any suitable number and combination of circuit blocks may be included. For example, in other embodiments, security and/or cryptographic circuit blocks may be included.

Figure 13:
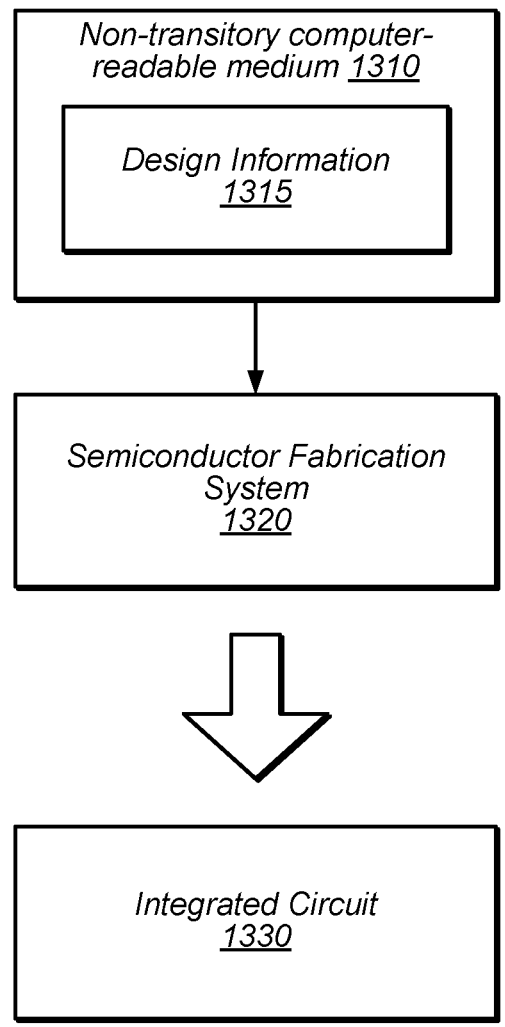
FIG. 13 illustrates a block diagram depicting an example computer-readable medium, according to some embodiments.

FIG. 13 is a block diagram illustrating an example of a non-transitory computer-readable storage medium that stores circuit design information, according to some embodiments. The embodiment of FIG. 13 may be utilized in a process to design and manufacture integrated circuits, such as, for example, an IC that includes computer system 1200 of FIG. 12. In the illustrated embodiment, semiconductor fabrication system 1320 is configured to process the design information 1315 stored on non-transitory computer-readable storage medium 1310 and fabricate integrated circuit 1330 based on the design information 1315.

Non-transitory computer-readable storage medium 1310, may comprise any of various appropriate types of memory devices or storage devices. Non-transitory computer-readable storage medium 1310 may be an installation medium, e.g., a CD-ROM, floppy disks, or tape device; a computer system memory or random-access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. Non-transitory computer-readable storage medium 1310 may include other types of non-transitory memory as well or combinations thereof. Non-transitory computer-readable storage medium 1310 may include two or more memory mediums which may reside in different locations, e.g., in different computer systems that are connected over a network.

Design information 1315 may be specified using any of various appropriate computer languages, including hardware description languages such as, without limitation: VHDL, Verilog, SystemC, SystemVerilog, RHDL, M, MyHDL, etc. Design information 1315 may be usable by semiconductor fabrication system 1320 to fabricate at least a portion of integrated circuit 1330. The format of design information 1315 may be recognized by at least one semiconductor fabrication system, such as semiconductor fabrication system 1320, for example. In some embodiments, design information 1315 may include a netlist that specifies elements of a cell library, as well as their connectivity. One or more cell libraries used during logic synthesis of circuits included in integrated circuit 1330 may also be included in design information 1315. Such cell libraries may include information indicative of device or transistor level netlists, mask design data, characterization data, and the like, of cells included in the cell library.

Integrated circuit 1330 may, in various embodiments, include one or more custom macrocells, such as memories, analog or mixed-signal circuits, and the like. In such cases, design information 1315 may include information related to included macrocells. Such information may include, without limitation, schematics capture database, mask design data, behavioral models, and device or transistor level netlists. As used herein, mask design data may be formatted according to graphic data system (gdsii), or any other suitable format.

Semiconductor fabrication system 1320 may include any of various appropriate elements configured to fabricate integrated circuits. This may include, for example, elements for depositing semiconductor materials (e.g., on a wafer, which may include masking), removing materials, altering the shape of deposited materials, modifying materials (e.g., by doping materials or modifying dielectric constants using ultraviolet processing), etc. Semiconductor fabrication system 1320 may also be configured to perform various testing of fabricated circuits for correct operation.

In various embodiments, integrated circuit 1330 is configured to operate according to a circuit design specified by design information 1315, which may include performing any of the functionality described herein. For example, integrated circuit 1330 may include any of various elements shown or described herein. Further, integrated circuit 1330 may be configured to perform various functions described herein in conjunction with other components. Further, the functionality described herein may be performed by multiple connected integrated circuits.

As used herein, a phrase of the form "design information that specifies a design of a circuit configured to . . . " does not imply that the circuit in question must be fabricated in order for the element to be met. Rather, this phrase indicates that the design information describes a circuit that, upon being fabricated, will be configured to perform the indicated actions or will include the specified components.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. An apparatus, comprising:
   a plurality of processor cores;
   a cache memory including a plurality of banks; and
   a power management circuit configured to:
   maintain a power credit approach for the apparatus that includes tracking a total number of currently available power credits;
   receive a plurality of threshold values, each threshold value associated with one or more of a plurality of throttling actions; and
   in response to the total number of currently available power credits reaching a particular threshold value of the plurality of threshold values, perform the one or more throttling actions associated with the particular threshold value;
   wherein the plurality of throttling actions includes:
   selectively throttling one or more of the plurality of processor cores, including:
   selecting a particular core of the plurality of processor cores to stall during a first clock cycle; and
   selecting a different core of the plurality of processing cores to stall during a successive clock cycle; and
   selectively throttling one or more of the plurality of banks in the cache memory.

2. The apparatus of claim 1, wherein to selectively throttle one or more of the plurality of processor cores, the power management circuit is further configured to, in response to reaching the particular threshold value, determine a particular order for stalling the plurality of processor cores.

3. The apparatus of claim 2, wherein to selectively throttle one or more of the plurality of processor cores, the power management circuit is further configured to, in response to reaching a different threshold value:
   determine a different order for stalling the plurality of processor cores; and
   based on the different order, select two or more processor cores to stall for a next clock cycle.

4. The apparatus of claim 1, wherein to selectively throttle one or more of the plurality of banks in the cache memory, the power management circuit is configured to, in response to reaching the particular threshold value:
   determine a particular pattern for inserting idle cycles for the cache memory; and
   based on the particular pattern, assert an indication for an idle cycle;
   wherein the cache memory is configured to, in response to detecting the indication for the idle cycle, stall an assignment of a memory request to a corresponding memory bank.

5. The apparatus of claim 4, wherein to selectively throttle one or more of the plurality of banks in the cache memory, the power management circuit is configured to, in response to reaching a different threshold value, determine a different pattern for inserting idle cycles for the cache memory, wherein the different pattern includes a different number of idle cycles than the particular pattern.

6. The apparatus of claim 1, wherein to maintain the power credit approach, the power management circuit is further configured to:
   receive, at a particular point in time, an allotment of a number of power credits;
   increase the total number of currently available power credits by the number of power credits; and
   based on energy values that are indicative of power consumption of the plurality of processor cores and the plurality of banks, decrement, at a different point in time, the total number of currently available power credits.

7. The apparatus of claim 1, wherein the plurality of throttling actions further includes reducing a frequency of a clock signal that is used by the plurality of processing cores and the cache memory.

8. A method comprising:
receiving, by a power management circuit, a plurality of threshold values, each threshold value associated with a respective number of power credits;
receiving, by the power management circuit at a particular point in time, an allotment of a number of power credits;
increasing, by the power management circuit using the allotment, a total number of currently available power credits for a processor that includes a plurality of processor cores and a cache memory;
based on energy values that are indicative of power consumption of the plurality of processor cores and the cache memory, decrementing, at a different point in time, the total number of currently available power credits;
in response to the total number of currently available power credits reaching, at a first point in time, a first threshold value of the plurality of threshold values, selectively throttling one or more processor cores of the plurality of processor cores; and
in response to the total number of currently available power credits reaching, at a second point in time, a second threshold value of the plurality of threshold values, selectively throttling one or more banks in the cache memory.

9. The method of claim 8, further comprising selectively throttling the one or more of the plurality of processor cores by:
determining a particular order for stalling the plurality of processor cores based on the first threshold value;
selecting, according to the particular order, a particular processor core to stall for a next clock cycle; and
selecting, according to the particular order, a next processor core to stall for a subsequent clock cycle.

10. The method of claim 9, further comprising, in response to the total number of currently available power credits reaching, at a third point in time, a third threshold value of the plurality of threshold values:
determining a different order for stalling the plurality of processor cores based on the third threshold value; and
selecting, according to the different order, a first processor core to stall for a next clock cycle; and
selecting, according to the different order, a second processor core to stall in addition to the first processor core for a subsequent clock cycle.

11. The method of claim 9, further comprising dithering the particular order each time the particular order is repeated.

12. The method of claim 8, further comprising selectively throttling the one or more of the banks in the cache memory by:
determining a particular pattern for inserting idle cycles for the cache memory; and
stalling, by the cache memory, an assignment of a memory request to a respective memory bank, in response to detecting an insertion of an idle cycle by the power management circuit.

13. The method of claim 12, further comprising, in response to the total number of currently available power credits reaching, at a third point in time, a third threshold value of the plurality of threshold values, determining a different pattern for inserting idle cycles for the cache memory, wherein the different pattern includes a different number of idle cycles than the particular pattern.

14. The method of claim 8, further comprising, in response to the total number of currently available power credits reaching, at a third point in time, a third threshold value of the plurality of threshold values, reducing a frequency of a clock signal that is used by the plurality of processing cores and the cache memory.

15. An apparatus, comprising:
a processor including:
a plurality of processor cores; and
a cache memory including a plurality of banks; and
a power management circuit configured to:
increase a total number of power credits by an allotted number of power credits;
decrement the total number of power credits based on energy values that are indicative of power consumption of the plurality of processor cores and the plurality of banks;
based on a current value of the total number of power credits reaching a particular threshold value of a plurality of threshold values, perform one or more throttling actions associated with the particular threshold value;
wherein the one or more throttling actions includes:
throttling, in an iterative fashion, individual processor cores of the plurality of processor cores; and
throttling, in an iterative fashion, individual banks of the plurality of banks including idling the cache memory for a first number of clock cycles after a second number of active clock cycles.

16. The apparatus of claim 15, wherein the power management circuit is further configured to, in response to reaching at least one threshold value of the plurality of threshold values, throttle at least one processor core and at least one bank in a same clock cycle.

17. The apparatus of claim 15, wherein to throttle the individual processor cores in an iterative fashion, the power management circuit is further configured to:
determine a particular order for stalling the plurality of processor cores;
select, according to the particular order, a particular processor core to stall for a next clock cycle; and
select, according to the particular order, a next processor core to stall for a subsequent clock cycle.

18. The apparatus of claim 17, wherein the power management circuit includes a randomizing circuit, and wherein to determine the particular order, the power management circuit is further configured to generate a pseudo-random value using the randomizing circuit.

19. The apparatus of claim 15, wherein to throttle individual banks of the plurality of banks in the cache memory, the power management circuit is configured to, in response to reaching the particular threshold value:
determine a particular pattern for inserting idle cycles for the cache memory; and
based on the particular pattern, assert an indication for an idle cycle;
wherein the cache memory is configured to, in response to detecting the indication for the idle cycle, stall an assignment of a memory request to a respective memory bank.

20. The apparatus of claim 19, wherein the power management circuit includes a plurality of registers configured to store respective patterns for inserting the idle cycles to the cache memory, and wherein the power management circuit is further configured to select the particular pattern from a corresponding register of the plurality of registers based on the particular threshold value.

21. An apparatus comprising:
a plurality of processor cores;
a cache memory including a plurality of banks; and
a power management circuit configured to:
  receive a plurality of threshold values, a particular threshold value associated with a subset of a plurality of throttling actions;
  receive, at a particular point in time, an allotment of a number of power credits;
  increase, using the allotment, a total number of currently available power credits for the plurality of processor cores and the cache memory;
  based on energy values that are indicative of power consumption of the plurality of processor cores and the cache memory, decrement, at a different point in time, the total number of currently available power credits; and
  in response to the total number of currently available power credits reaching the particular threshold value, perform the subset of throttling actions associated with the particular threshold value;
  wherein the plurality of throttling actions includes:
    selectively throttling one or more of the plurality of processor cores; and
    selectively throttling one or more of the plurality of banks in the cache memory.

22. The apparatus of claim 21, wherein to selectively throttle the one or more of the plurality of processor cores, the power management circuit is further configured to:
determine a particular order for stalling the plurality of processor cores; and
dither the particular order in response to repeating the particular order.

23. The apparatus of claim 22, wherein the power management circuit includes a randomizing circuit, and wherein to dither the particular order, the power management circuit is further configured to generate a pseudo-random value using the randomizing circuit.

24. The apparatus of claim 21, wherein the power management circuit is further configured, in response to the total number of currently available power credits reaching a different threshold value of the plurality of threshold values, to reduce a frequency of a clock signal that is used by the plurality of processing cores and the cache memory.

* * * * *